(12) United States Patent
Arimoto et al.

(10) Patent No.: US 6,307,540 B1
(45) Date of Patent: Oct. 23, 2001

(54) IMAGE PROCESSING SYSTEM

(75) Inventors: Shinobu Arimoto, Tokyo; Masanori Yamada, Kawasaki; Katsuichi Shimizu, Kunitachi, all of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 08/432,524

(22) Filed: May 1, 1995

Related U.S. Application Data

(62) Division of application No. 08/197,451, filed on Feb. 16, 1994, now Pat. No. 5,977,954, which is a continuation of application No. 08/021,721, filed on Feb. 23, 1993, now abandoned, which is a continuation of application No. 07/566,310, filed on Aug. 13, 1990, now abandoned, which is a continuation of application No. 07/110,538, filed on Oct. 20, 1987, now abandoned, which is a continuation of application No. 06/536,982, filed on Sep. 29, 1983, now abandoned.

(30) Foreign Application Priority Data

| Oct. 1, 1982 | (JP) | 57-172935 |
|---|---|---|
| Oct. 18, 1982 | (JP) | 57-182648 |
| Oct. 25, 1982 | (JP) | 57-187248 |
| Oct. 25, 1982 | (JP) | 57-187249 |

(51) Int. Cl.$^7$ ............................. G09G 5/00

(52) U.S. Cl. ..................... 345/168; 345/173; 399/81

(58) Field of Search .................. 345/168, 169, 345/170, 171, 172, 173, 157, 156; 341/22, 23; 399/81, 84, 85

(56) References Cited

U.S. PATENT DOCUMENTS

| 3,482,241 | 12/1969 | Johnson | 340/337 |
|---|---|---|---|
| 3,798,599 | 3/1974 | Kafafian | 340/825.19 |
| 4,134,537 | 1/1979 | Glaser et al. | 235/379 |
| 4,280,121 | 7/1981 | Crask | 340/365 C |
| 4,300,829 | 11/1981 | Braswell et al. | 340/365 |

(List continued on next page.)

FOREIGN PATENT DOCUMENTS

| 3030099 | 2/1981 | (DE) . |
|---|---|---|
| 3043081 | 5/1981 | (DE) . |
| 0030160 | 6/1981 | (EP) . |

(List continued on next page.)

OTHER PUBLICATIONS

Research Disclosure Document No. 21752, May 1982, pp. 186–188. IBM Model 60 Series III copier/duplicator key operator instructions manual, pp. 35 and 95, First Edition (Apr. 1982).

(List continued on next page.)

*Primary Examiner*—Xiao Wu
(74) *Attorney, Agent, or Firm*—Fitzpatrick, Cella, Harper & Scinto

(57) ABSTRACT

An image processing system comprises a printer and a reader which are mechanically and functionally separated in such a manner that they can be used independently of each other and the transmission of image information is possible therebetween. Said reader includes an operating unit which cooperates with the printer to perform many functions such as the image operating function, the image transfer function, the presetting function and the image quality processing function, in addition to a function of a conventional copier. Said operating unit consists of a general purpose key portion; a soft key portion which is used for optionally creating the copy transfer functions and having function keys and displays corresponding to said keys, said displays being adapted to display key labels and messages to a user in cooperation with a driver, CPU and controller; and a function key preset key portion which is used for registering, reading and resetting the image transfer functions and having a standard mode return key, preset keys and preset key displays corresponding to said reset keys and adapted to display the reset position.

36 Claims, 43 Drawing Sheets

U.S. PATENT DOCUMENTS

| | | | |
|---|---|---|---|
| 4,310,839 | 1/1982 | Schwerdt | 340/712 |
| 4,313,108 | 1/1982 | Yoshida | 340/712 |
| 4,327,994 | 5/1982 | Barley et al. | 355/14 R |
| 4,333,097 * | 6/1982 | Buric et al. | 345/168 |
| 4,393,375 | 7/1983 | Suguira et al. | 340/700 |
| 4,413,314 | 11/1983 | Slater | 340/712 |
| 4,431,988 | 2/1984 | Molusis et al. | 340/712 |
| 4,475,806 * | 10/1984 | Daughton et al. . | |
| 4,481,508 | 11/1984 | Kamei et al. | 340/712 |
| 4,562,485 | 12/1985 | Maeshima | 358/280 |
| 5,105,285 | 4/1992 | Miyata . | |
| 5,369,733 | 11/1994 | Arimoto et al. . | |

FOREIGN PATENT DOCUMENTS

| | | |
|---|---|---|
| 50-46444 | 4/1975 | (JP) . |
| 51-105737 | 9/1976 | (JP) . |
| 51-147558 | 12/1976 | (JP) . |
| 52-96526 | 8/1977 | (JP) . |
| 52-115627 | 9/1977 | (JP) . |
| 52-142517 | 11/1977 | (JP) . |
| 53-41959 | 4/1978 | (JP) . |
| 54-547 | 1/1979 | (JP) . |
| 54-5795 | 1/1979 | (JP) . |
| 54-7329 | 1/1979 | (JP) . |
| 54-22127 | 2/1979 | (JP) . |
| 54-74750 | 6/1979 | (JP) . |
| 54-108526 | 8/1979 | (JP) . |
| 55-49740 | 4/1980 | (JP) . |
| 55-76381 | 6/1980 | (JP) . |
| 55-76462 | 6/1980 | (JP) . |
| 55-82332 | 6/1980 | (JP) . |
| 55-115137 | 9/1980 | (JP) . |
| 56-36657 | 4/1981 | (JP) . |
| 56-36730 | 4/1981 | (JP) . |
| 56-72449 | 6/1981 | (JP) . |
| 56-94366 | 7/1981 | (JP) . |
| 56-105526 | 8/1981 | (JP) . |
| 57-5094 | 1/1982 | (JP) . |
| 57-20751 | 2/1982 | (JP) . |
| 57-73416 | 5/1982 | (JP) . |
| 57-150857 | 9/1982 | (JP) . |
| 57-169813 | 10/1982 | (JP) . |
| 58-24156 | 2/1983 | (JP) . |
| 58-208758 | 12/1983 | (JP) . |
| 59-12154 | 1/1984 | (JP) . |
| 59-13771 | 3/1984 | (JP) . |
| 59-9309 | 3/1984 | (JP) . |
| 59-61853 | 4/1984 | (JP) . |
| 59-188665 | 10/1984 | (JP) . |
| 60-460 | 1/1985 | (JP) . |
| 60-37487 | 8/1985 | (JP) . |
| 61-60427 | 12/1986 | (JP) . |
| 62-38729 | 8/1987 | (JP) . |
| 2-26223 | 6/1990 | (JP) . |
| 3-3224 | 1/1991 | (JP) . |
| 4-14351 | 3/1992 | (JP) . |

OTHER PUBLICATIONS

IBM Technical Disclosure Bulletin, vol. 18, No. 10, Mar. 1976, pp. 3162–3163.

"Der Euro–Apple", H.G. Joepgen, "Funkschau 1979", No. 14, pp. 831–834.

Program "Fisiplot", version 1.0, The Addison–Wesley Book of Apple Computer Software 1982, 1981, published by The Book Company, Library of Congress, #80–545255, pp. 216–217.

* cited by examiner

FIG. 1-A
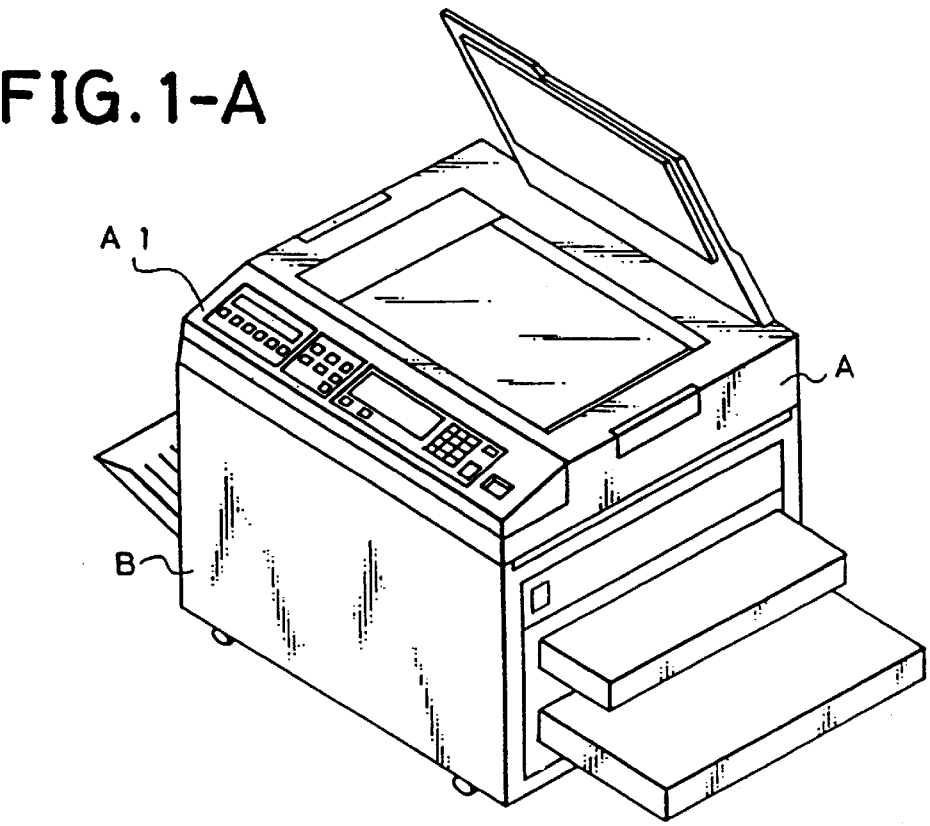
FIG. 1-B
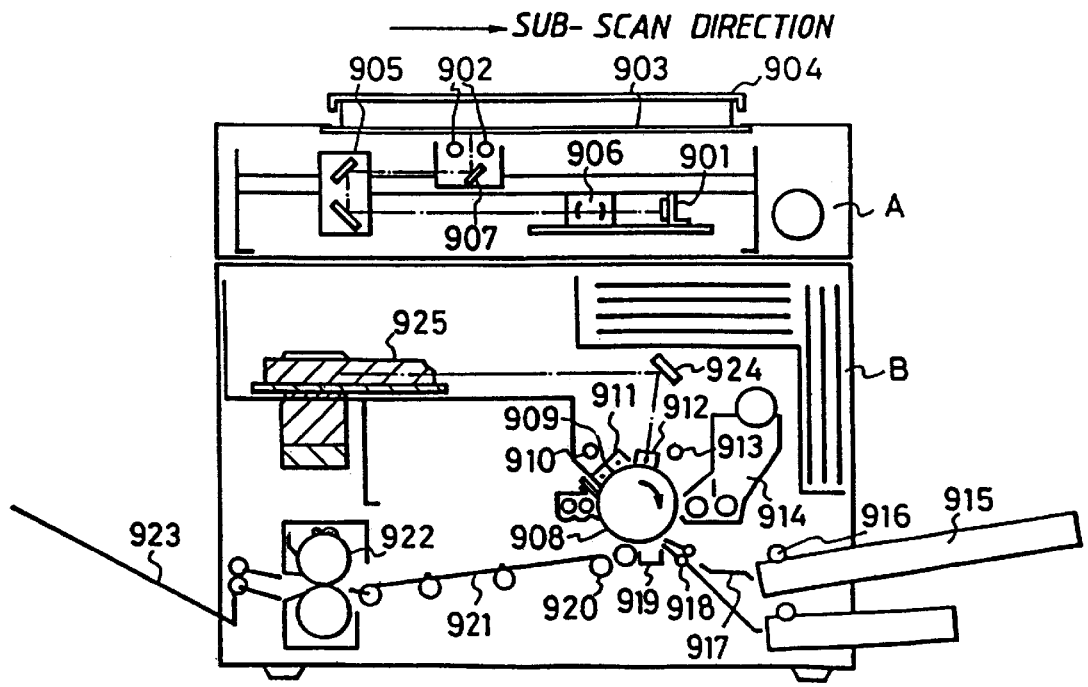

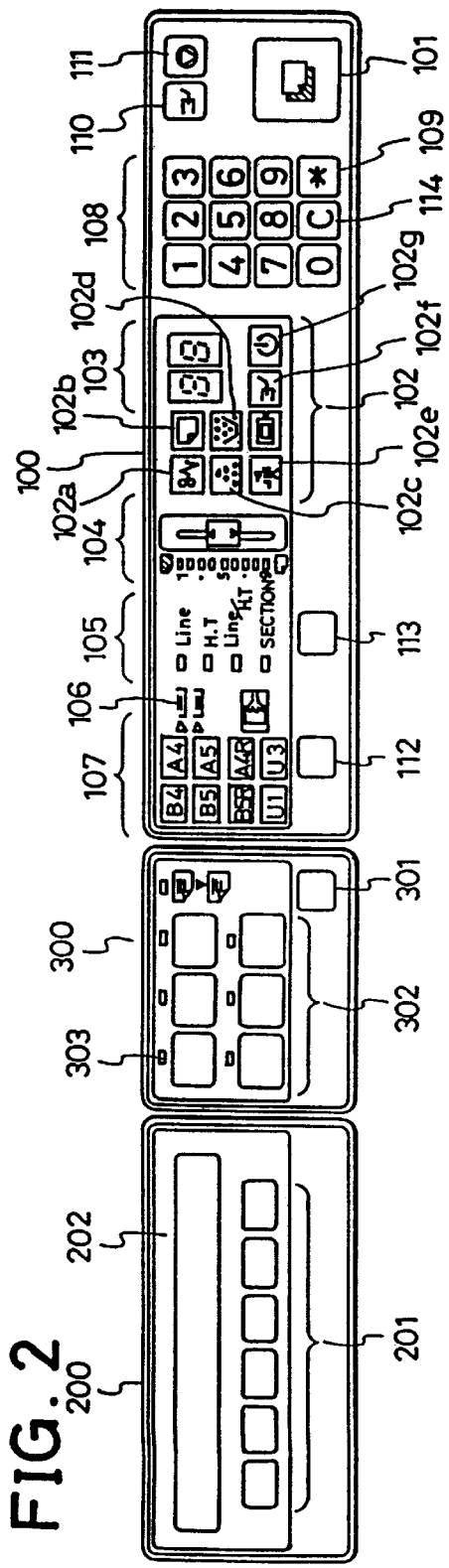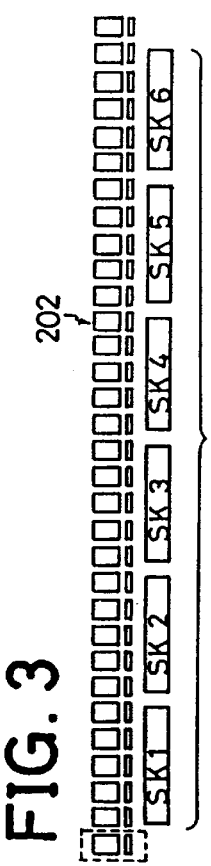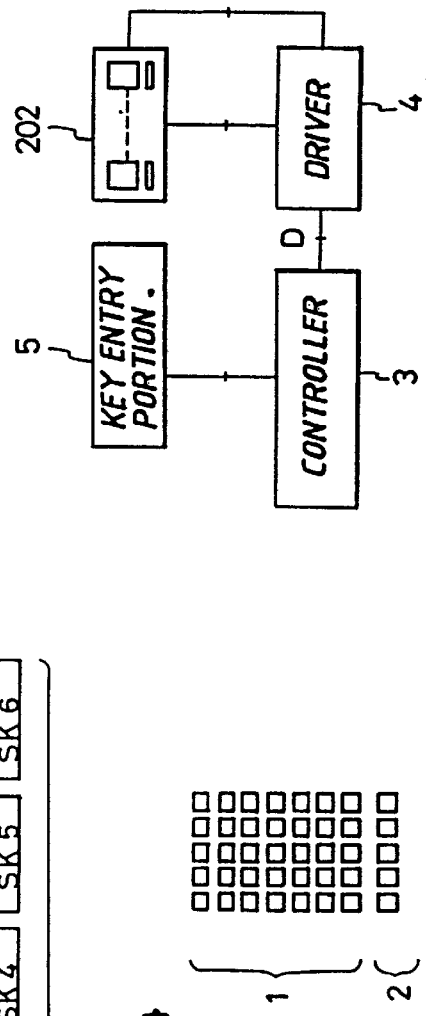

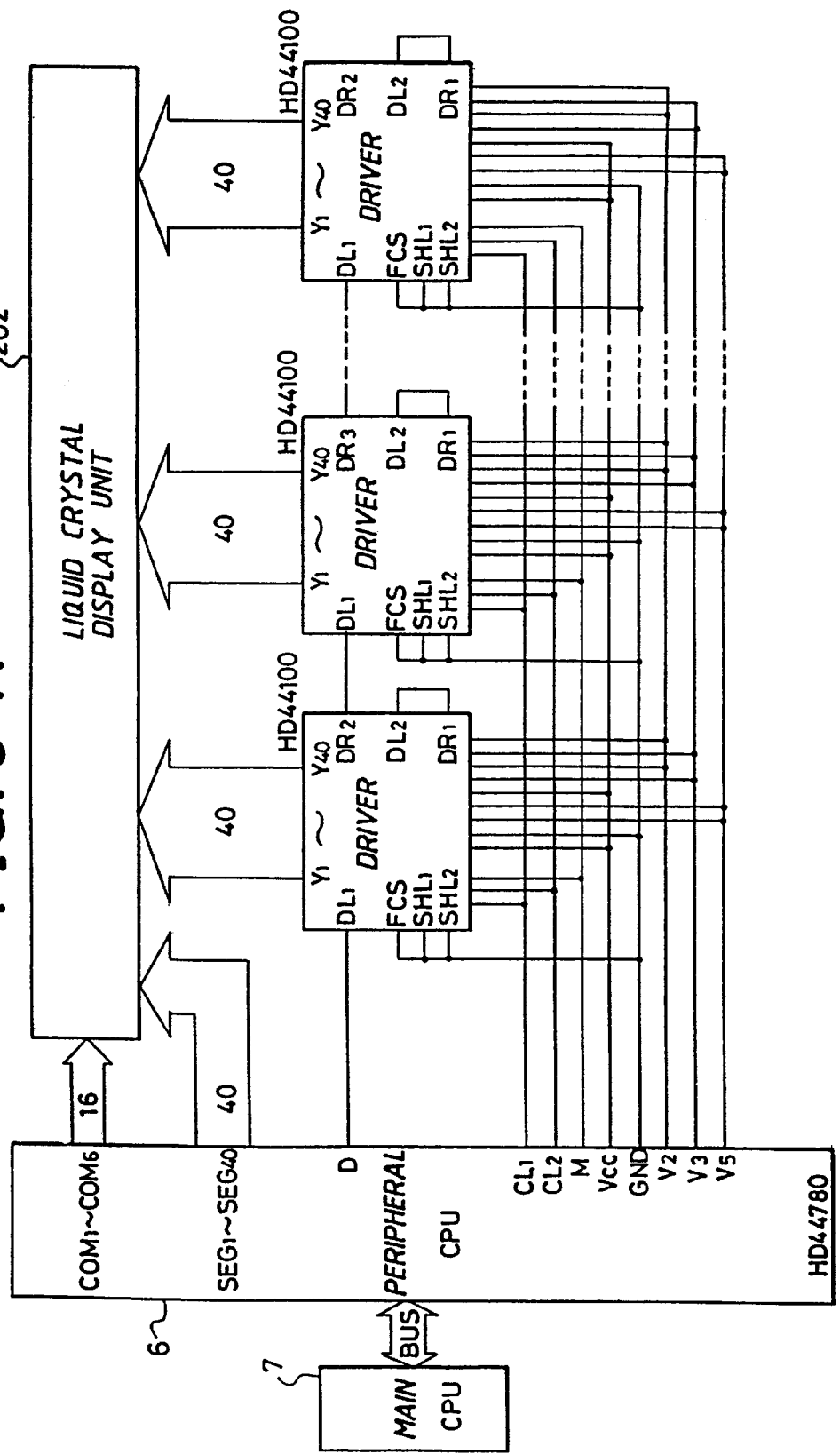
FIG. 6-A

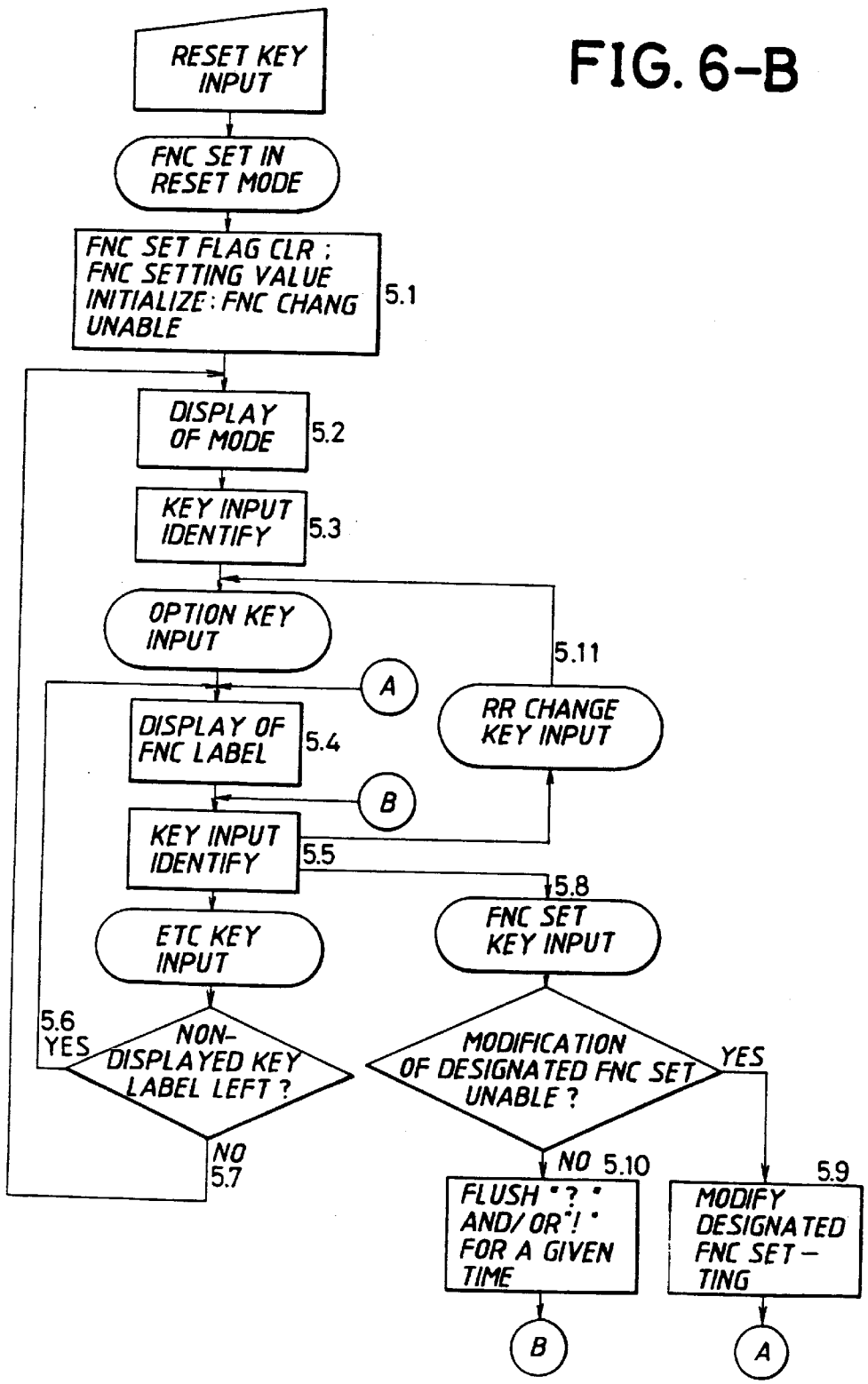
FIG. 6-B

FIG. 6-C
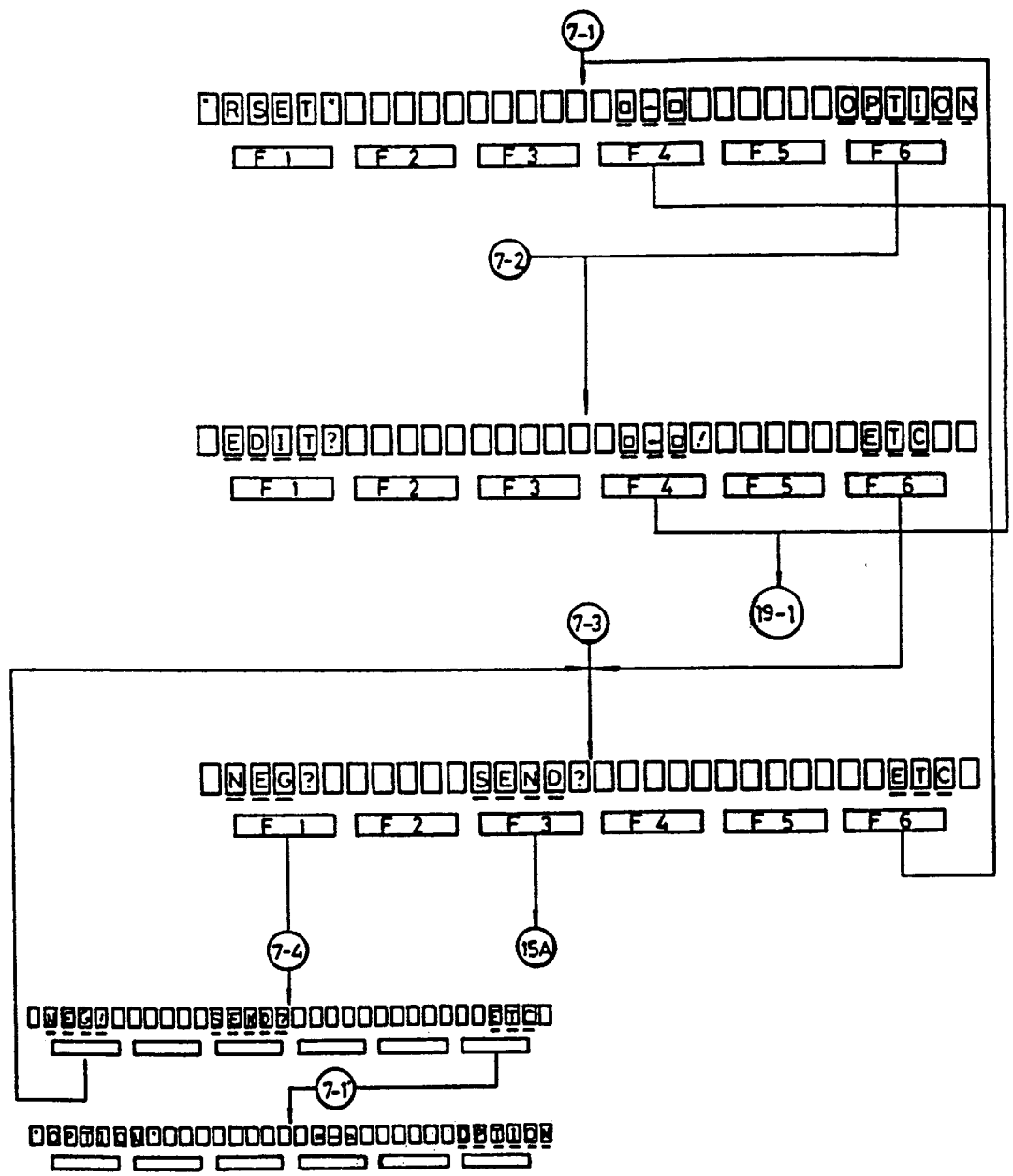

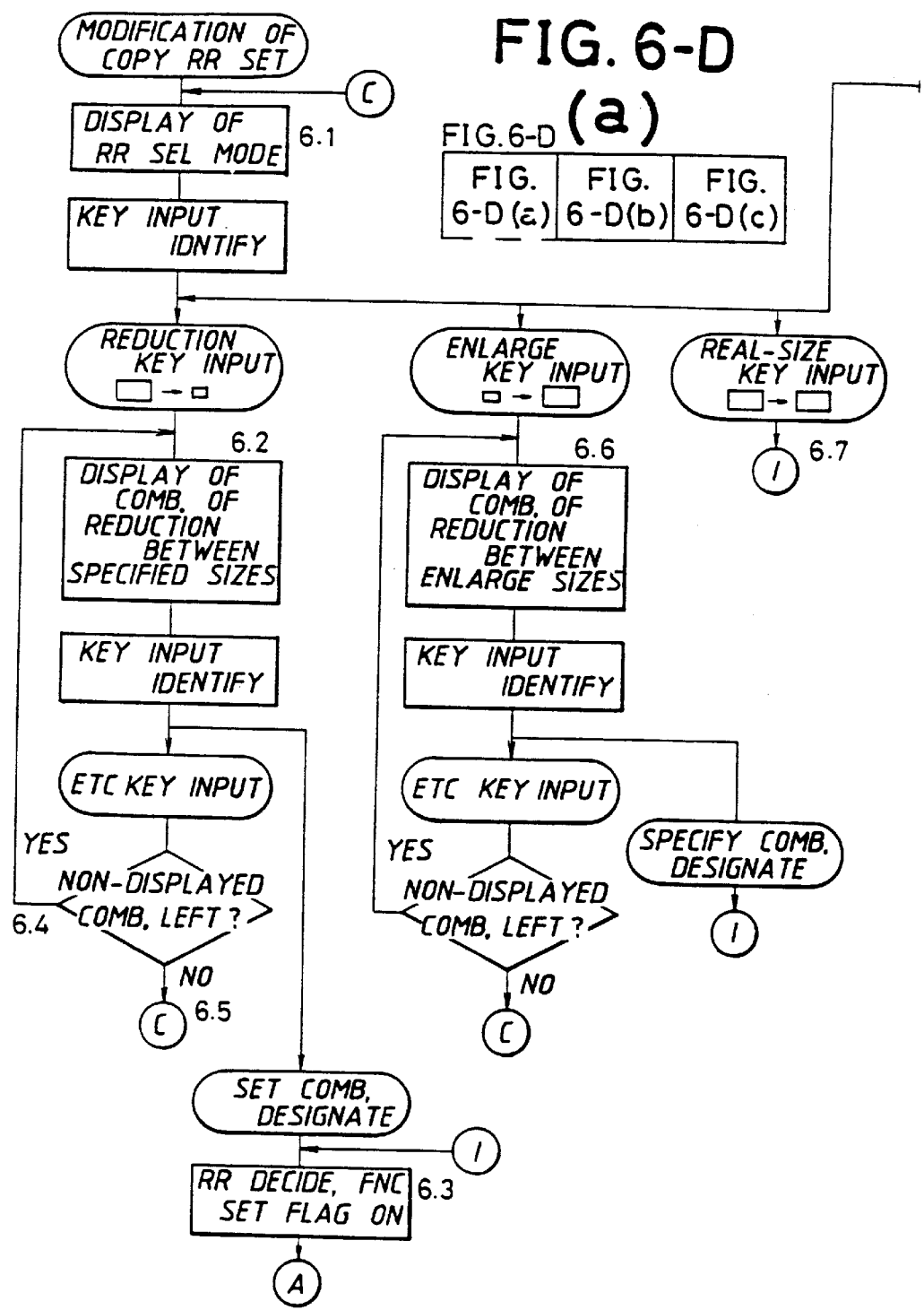

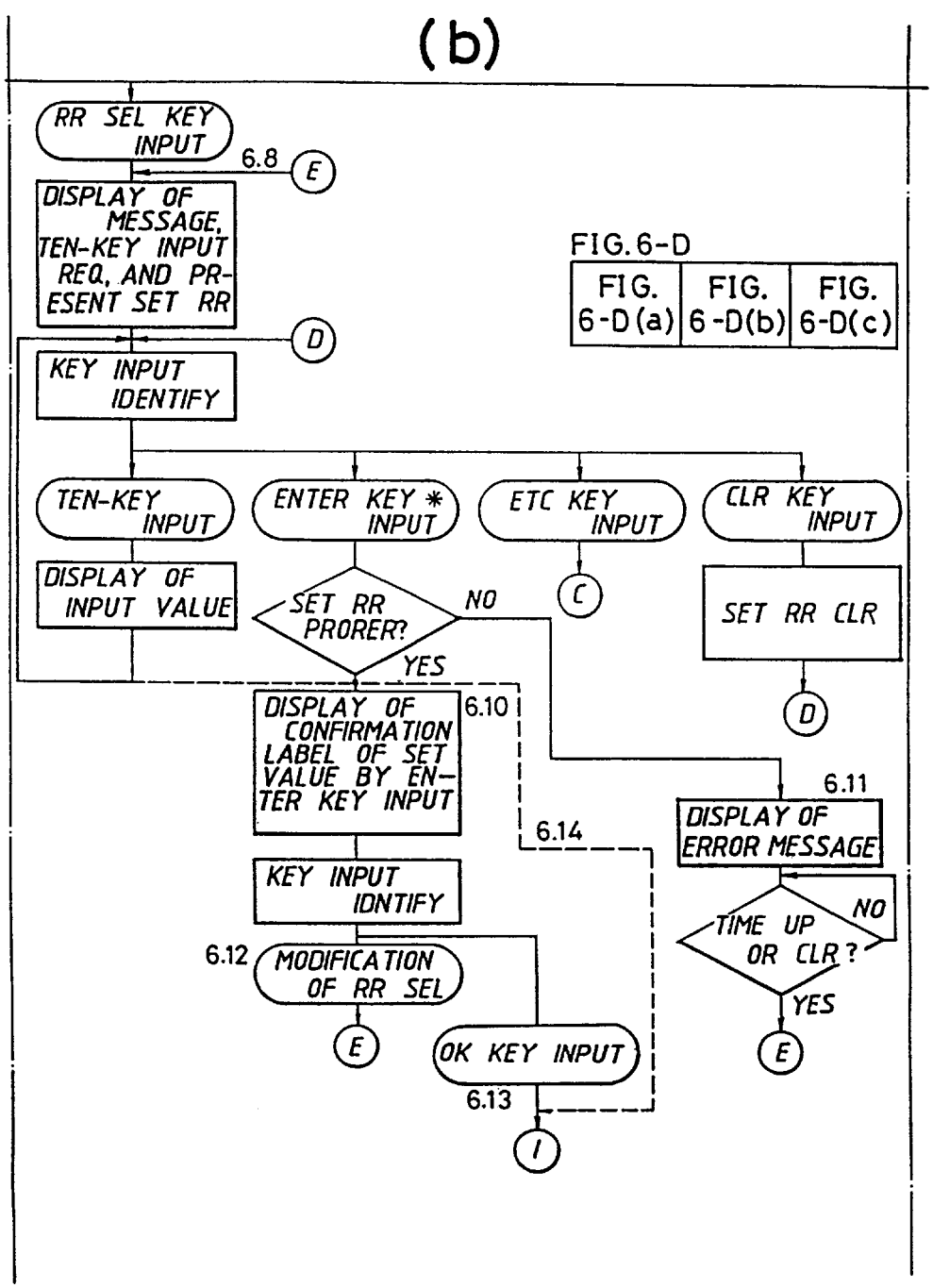
FIG. 6-D (b)

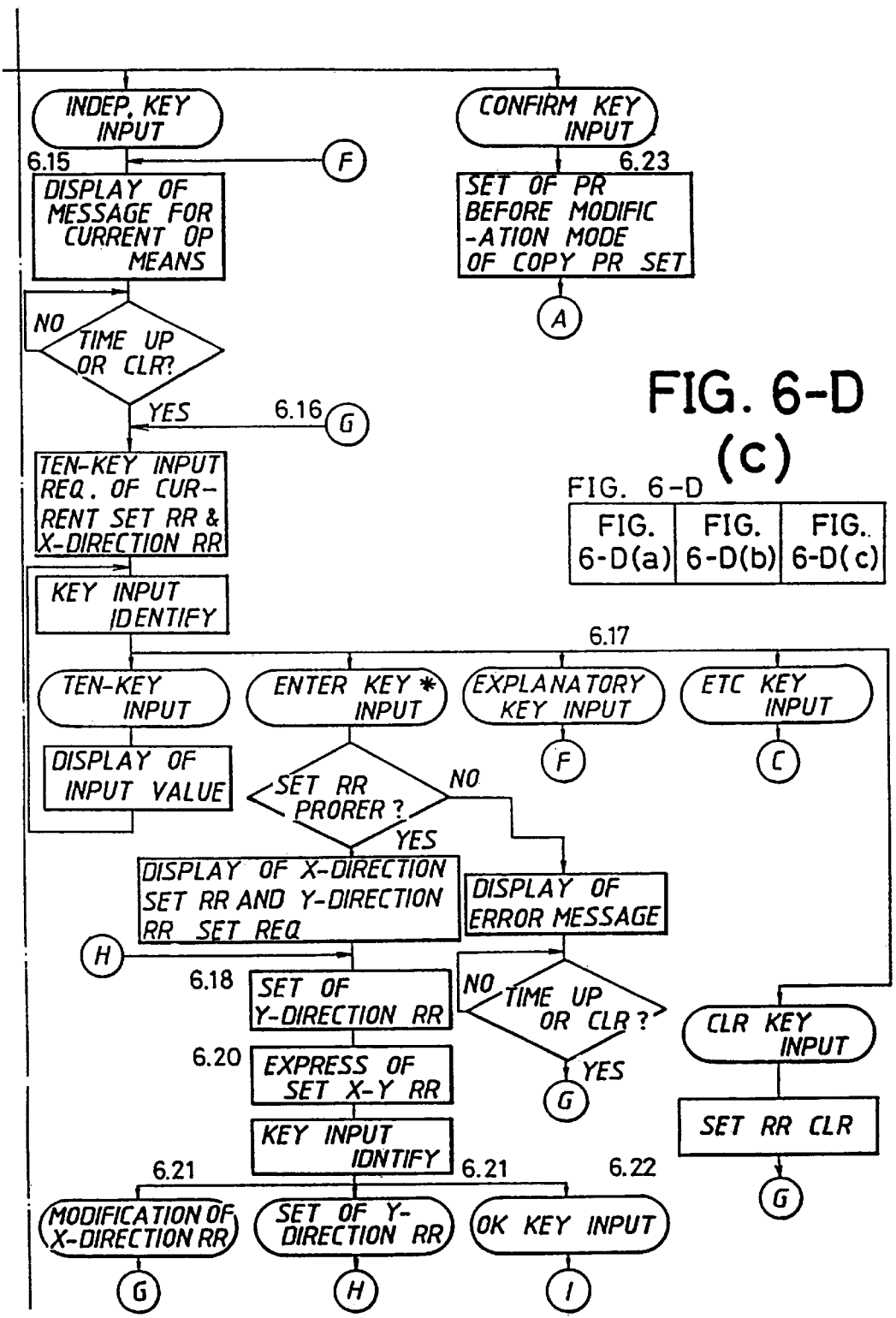

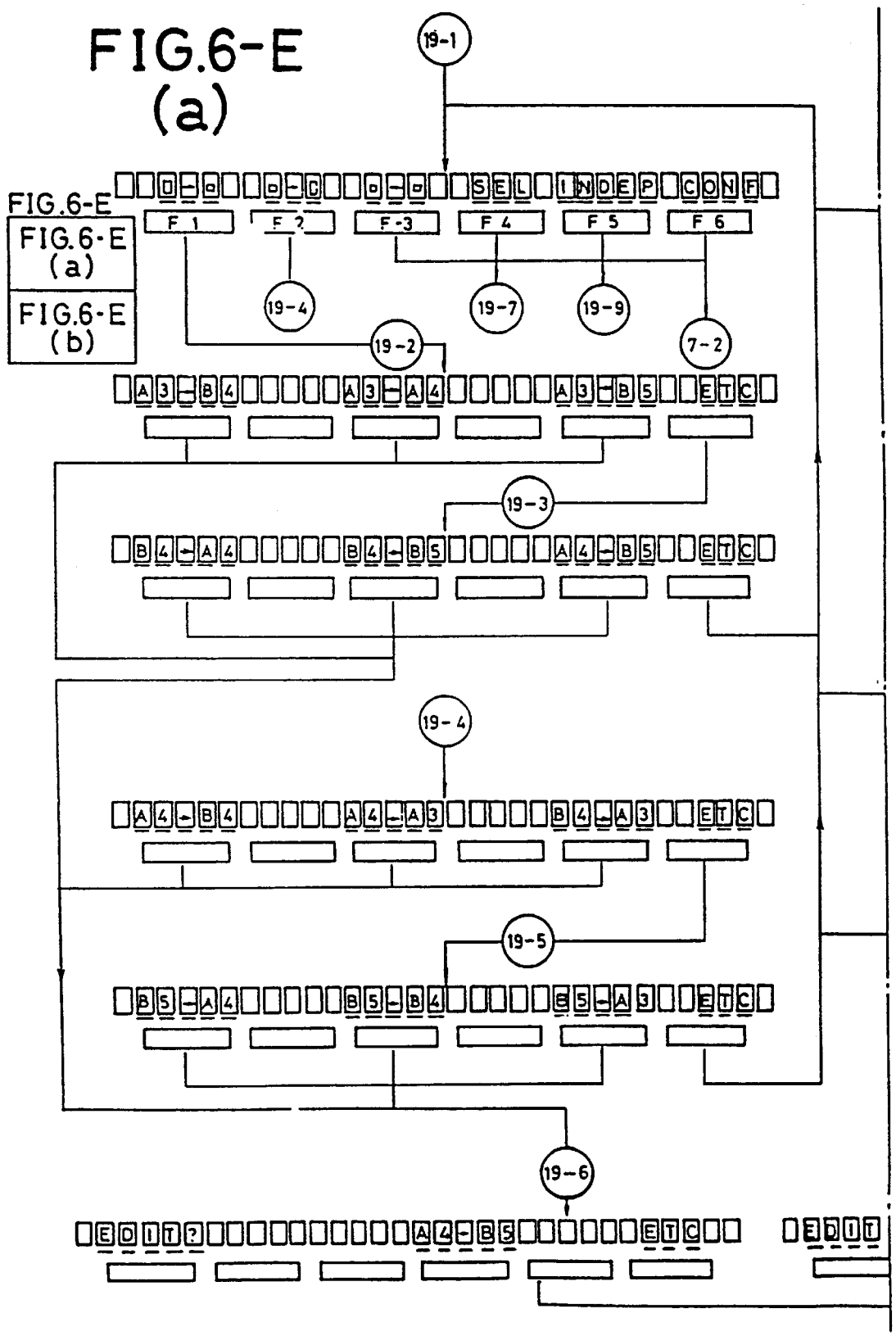

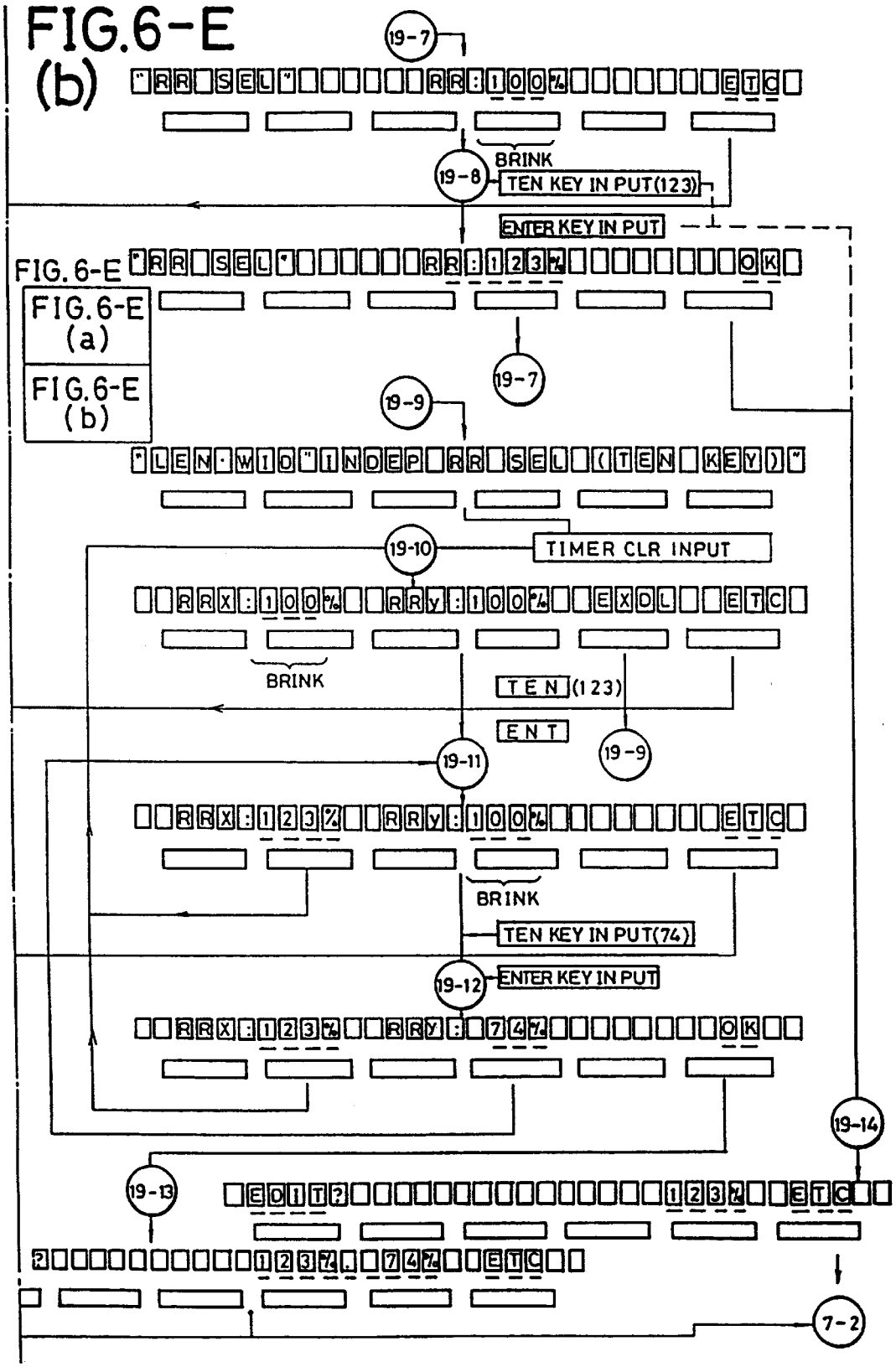

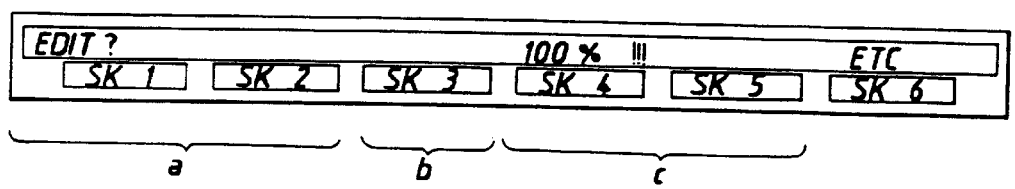

FIG. 8-A
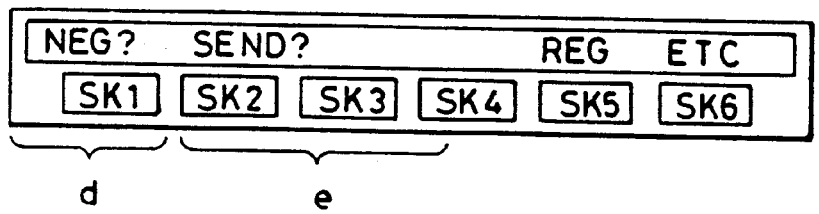
FIG. 8-B
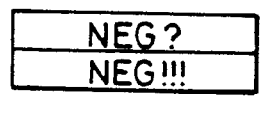
FIG. 8-C
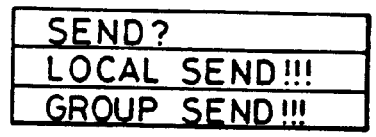
FIG. 9-A
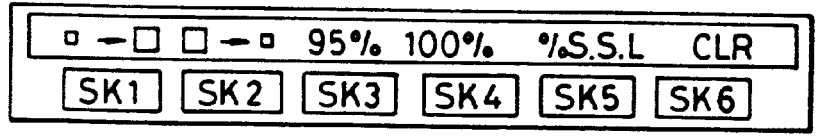

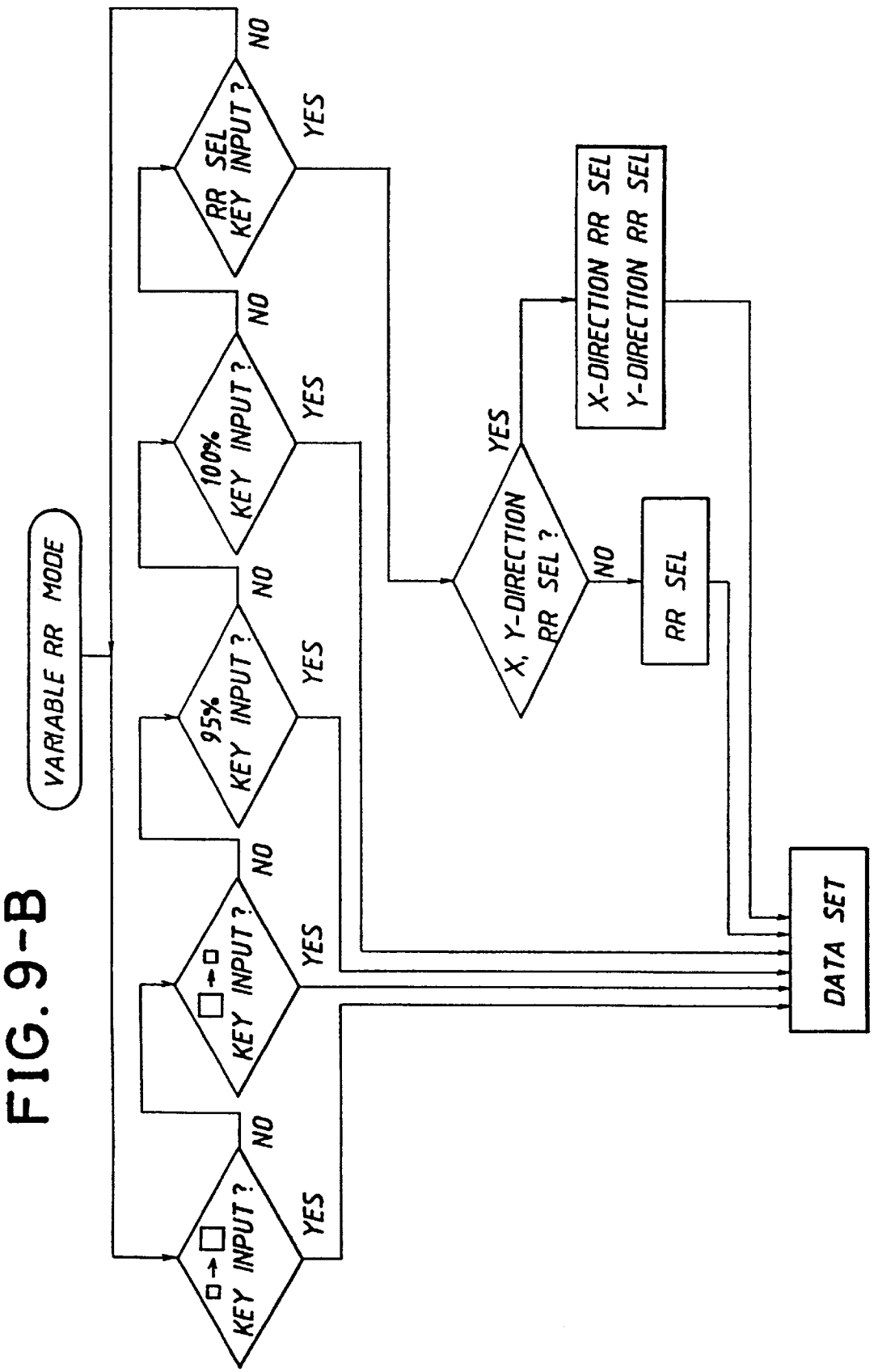

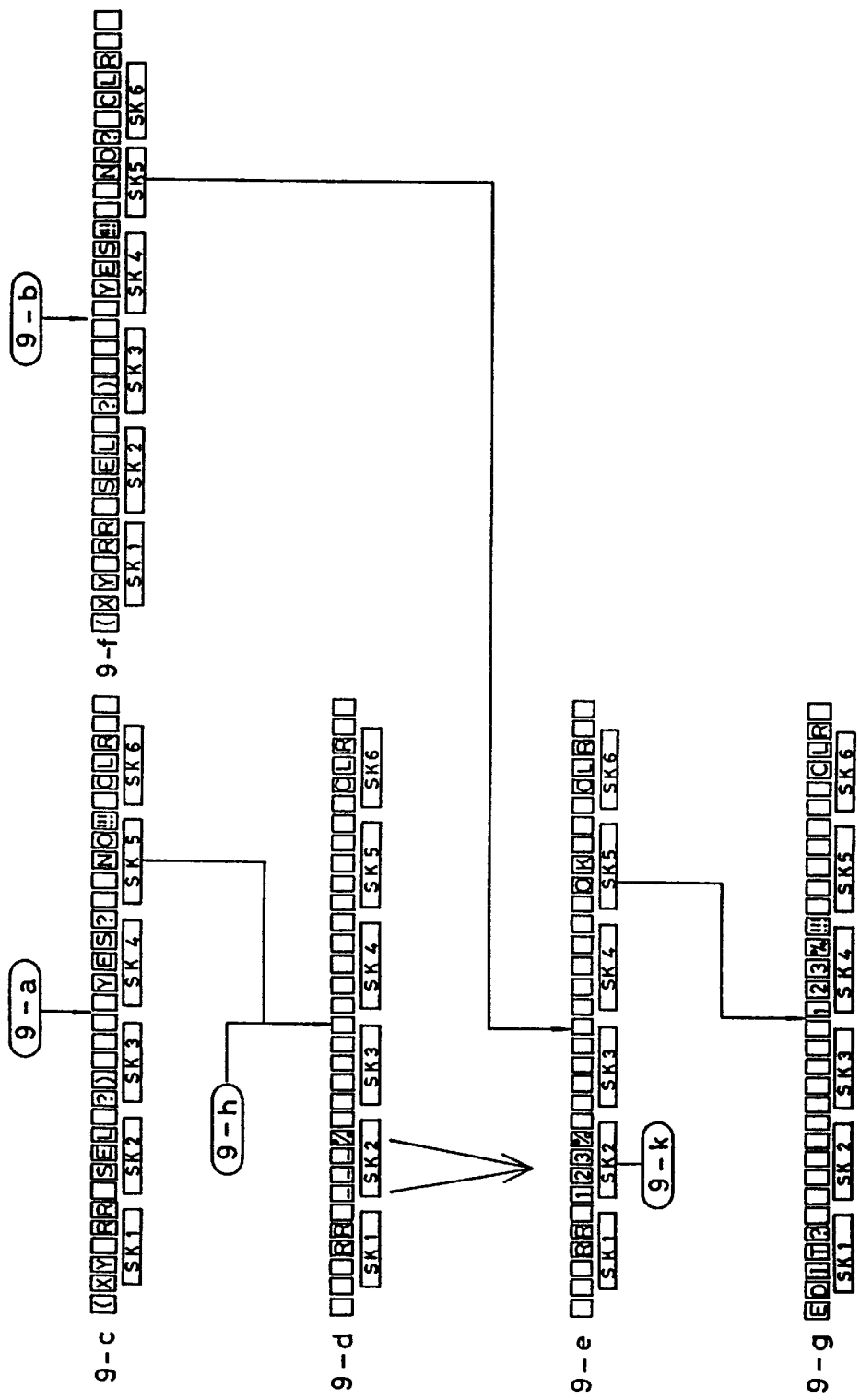
FIG. 9-C

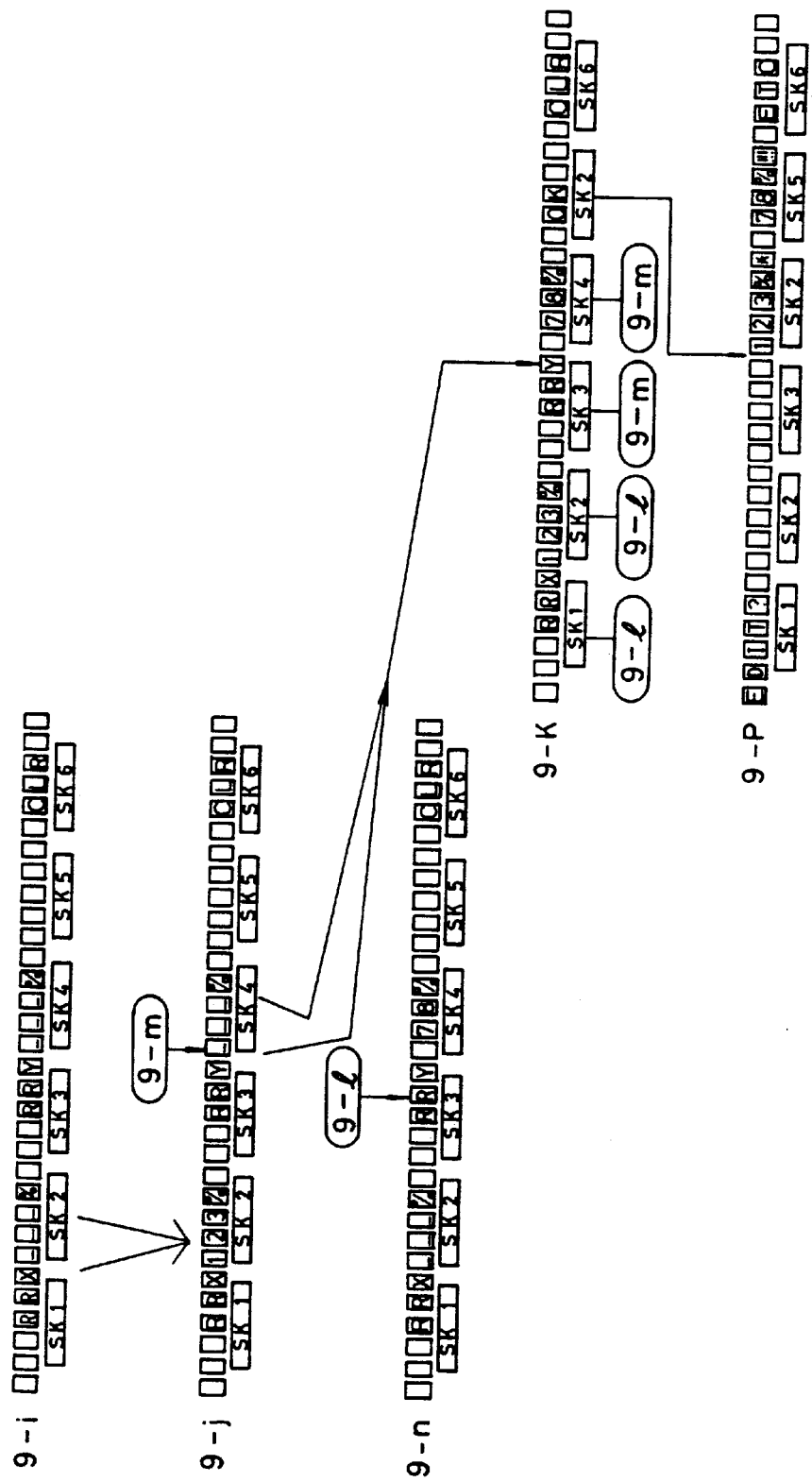
FIG. 9-D

FIG. 10-A
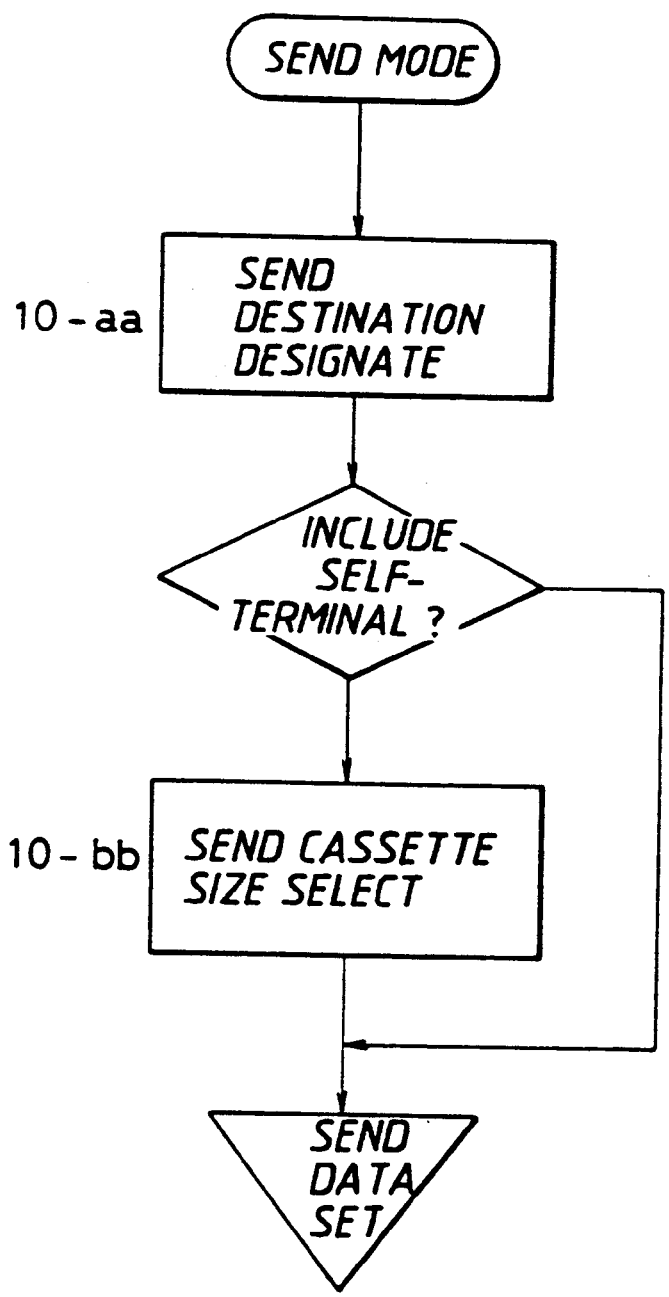

FIG.10-B
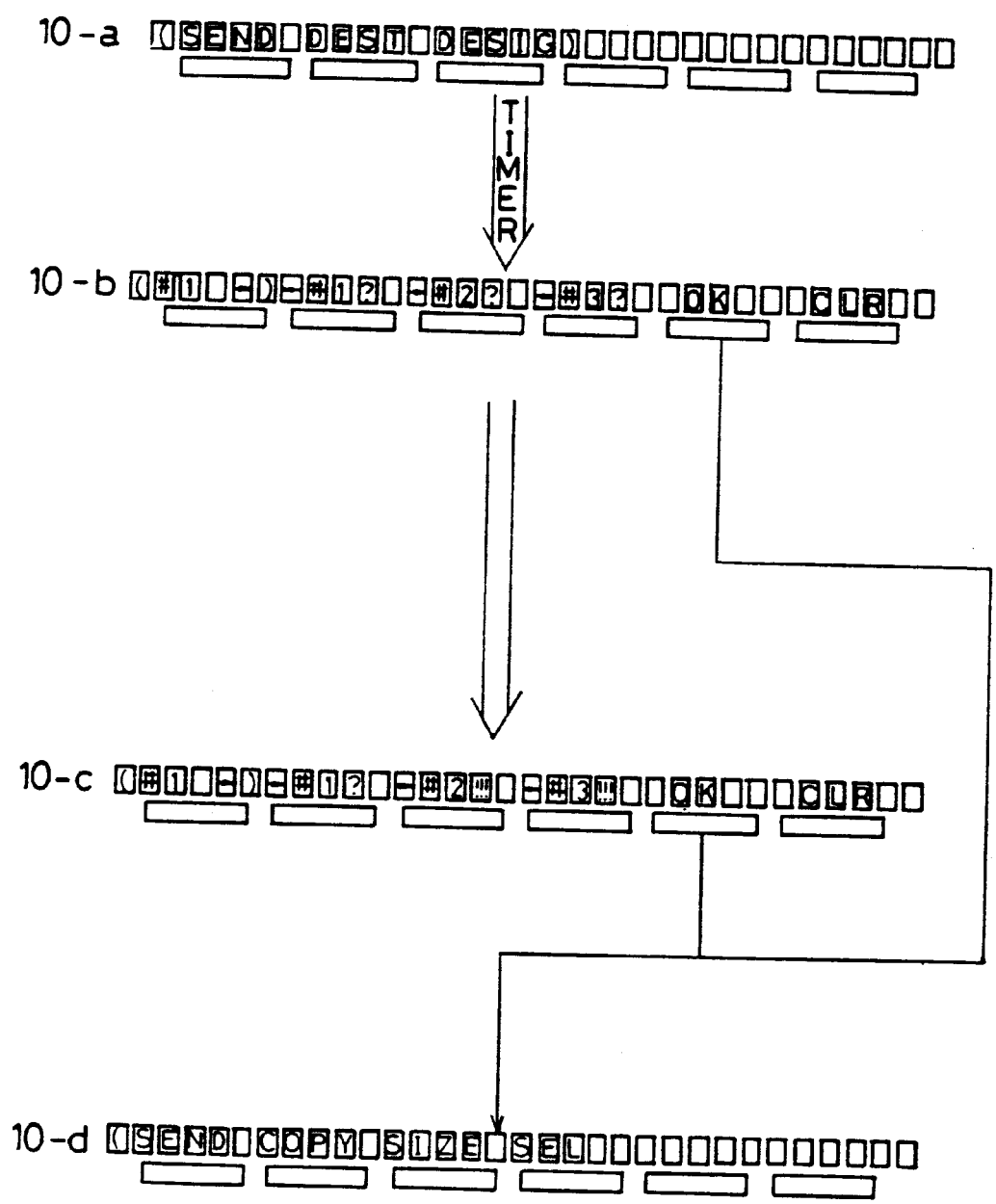

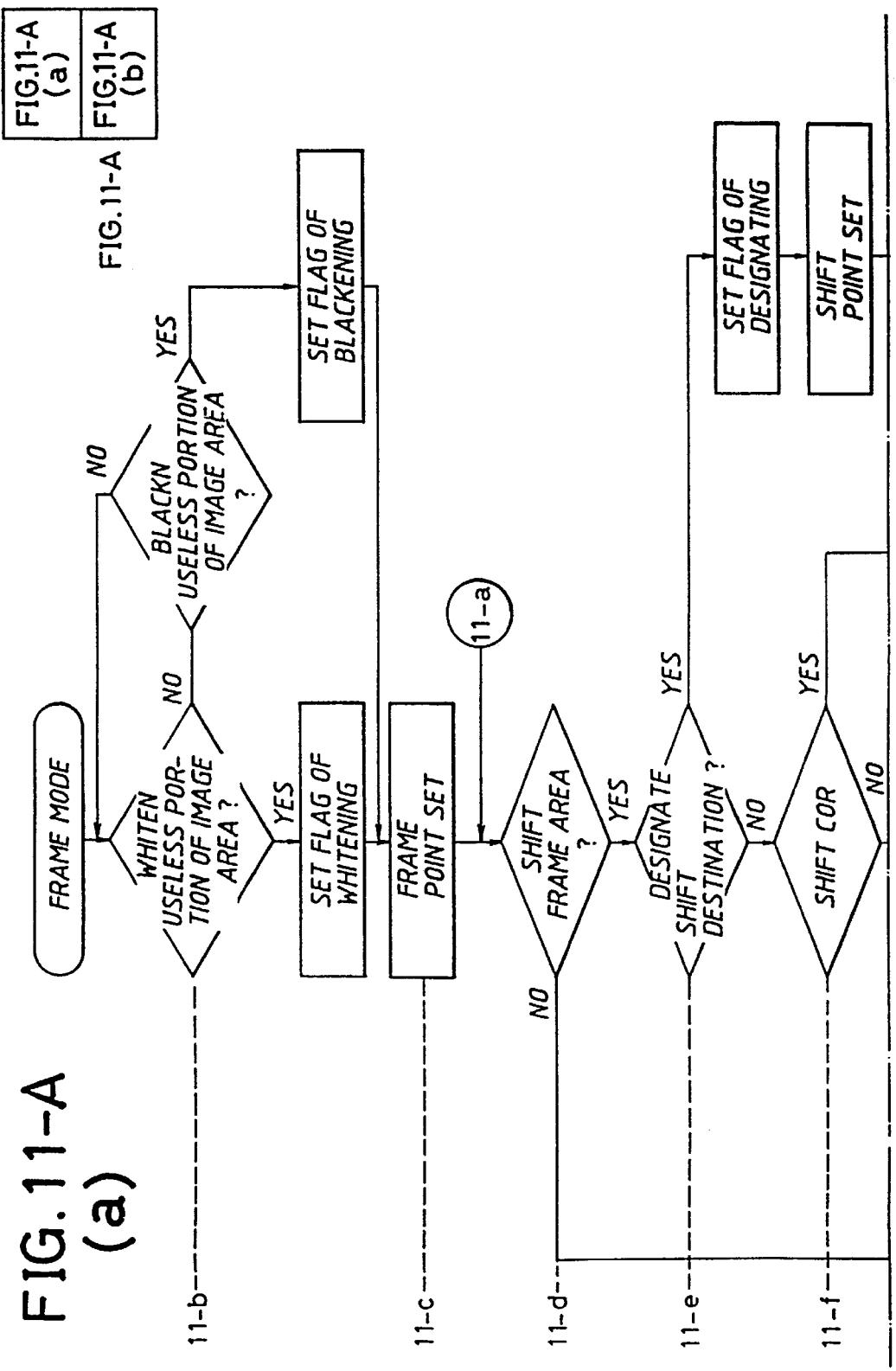

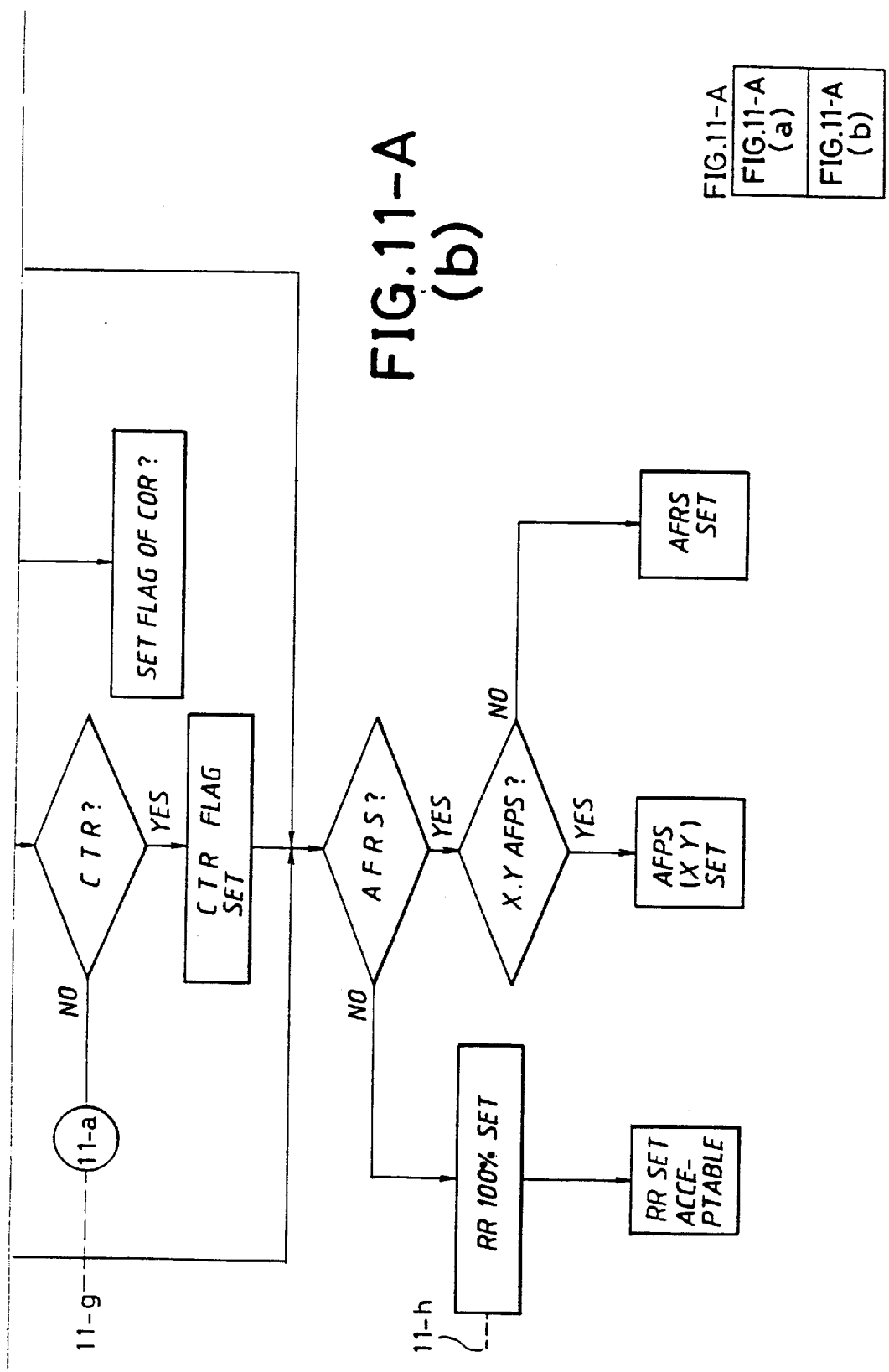

FIG. 11-B

FIG. 12-A
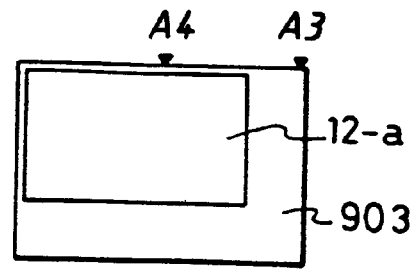
FIG. 12-B
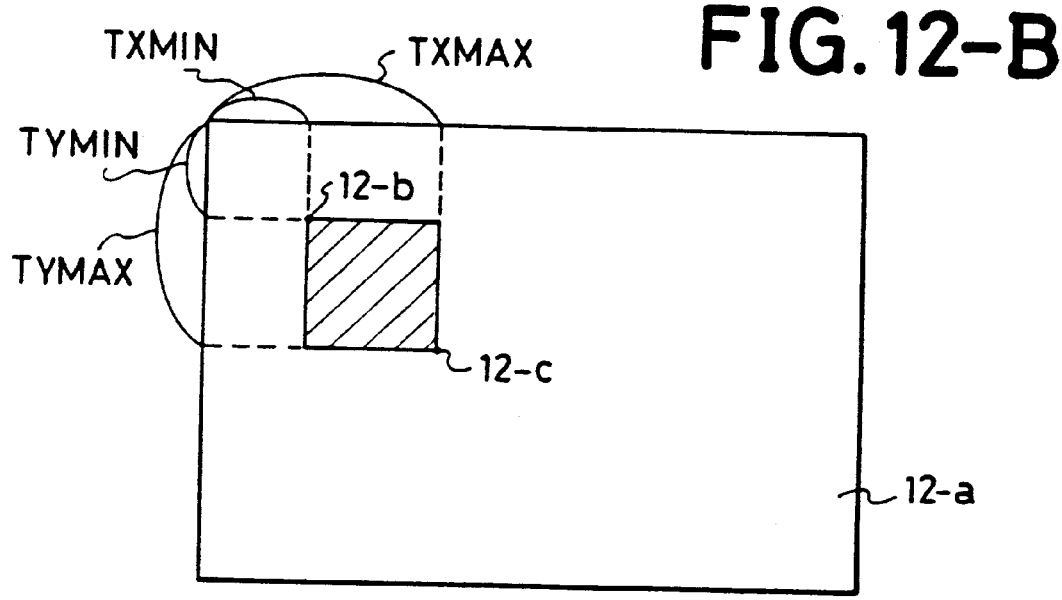
FIG. 12-C
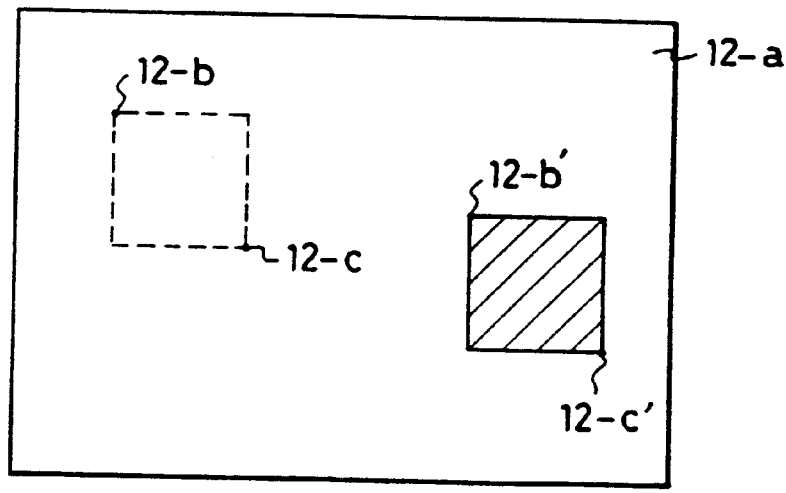

FIG.12-D
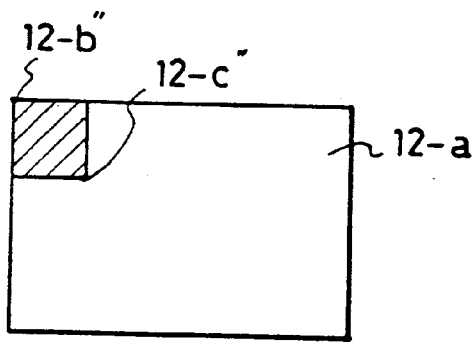
FIG.12-E
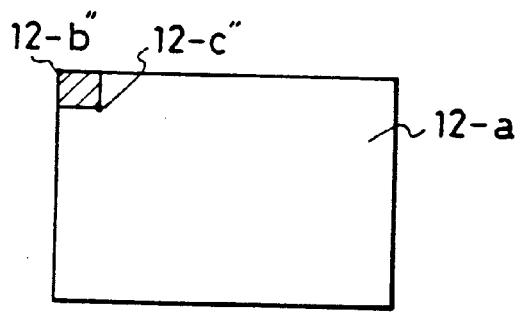
FIG.12-F
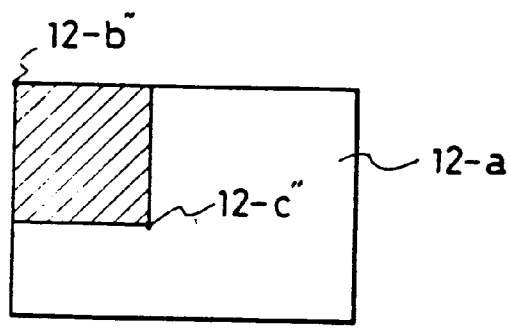

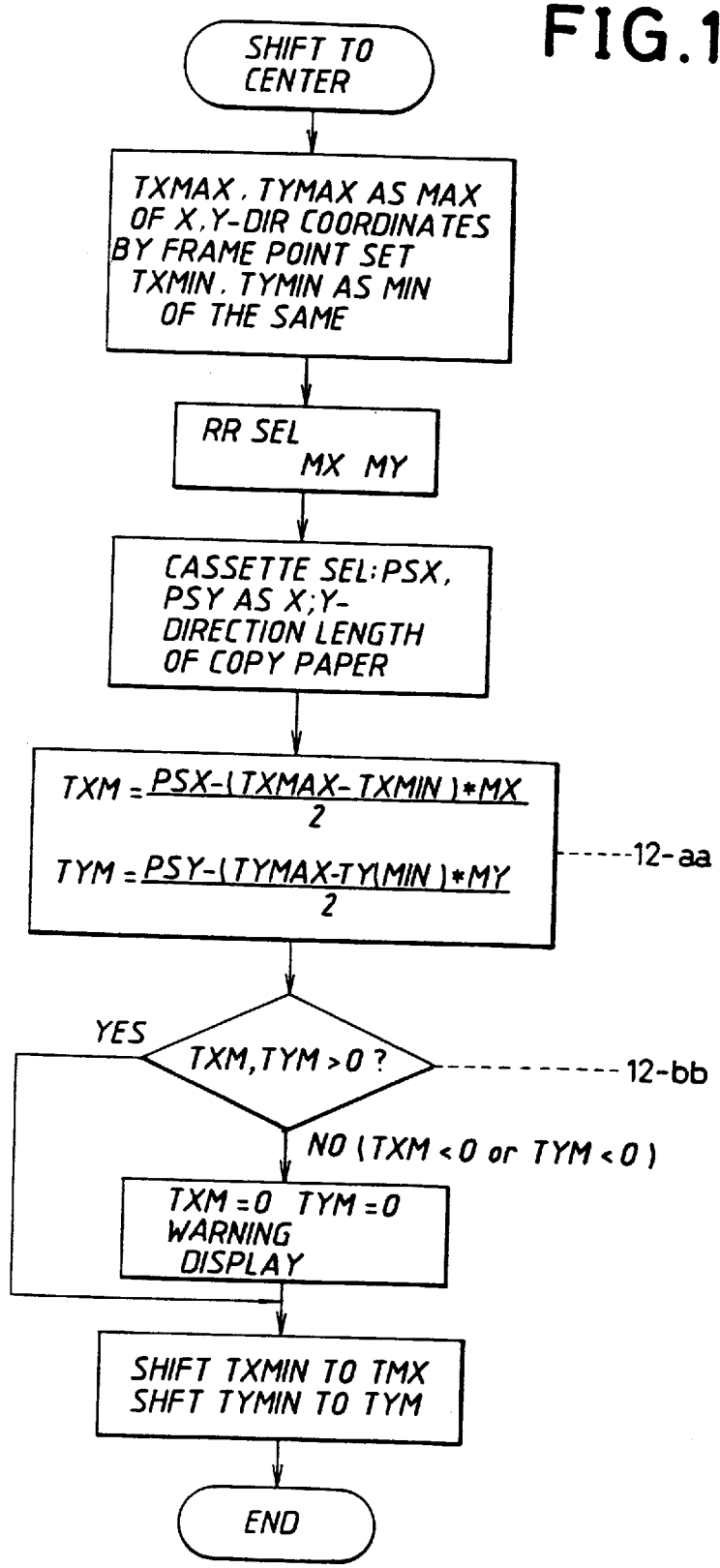
FIG.12-G

FIG. 12-H
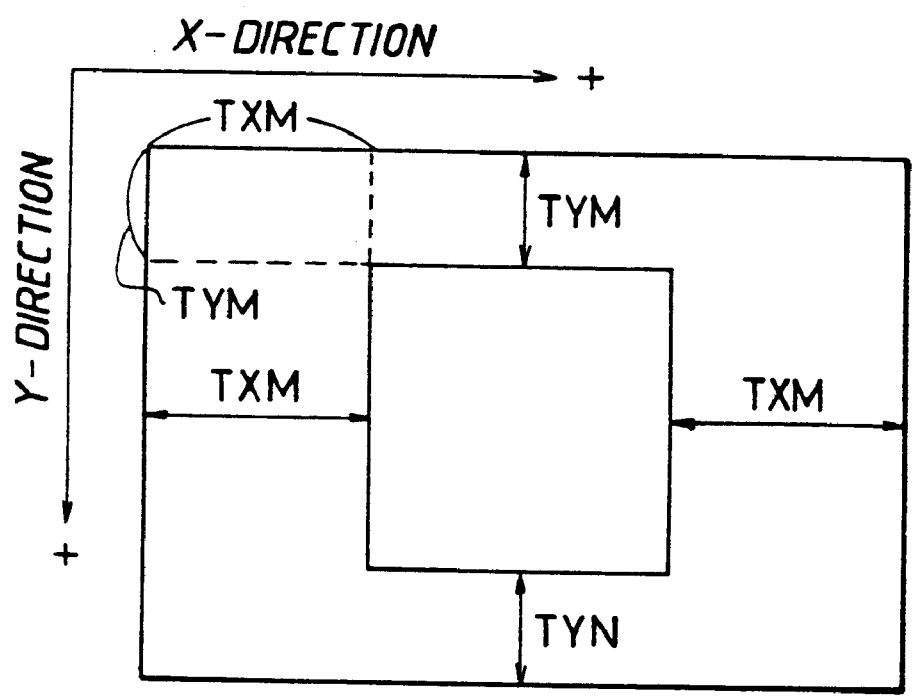

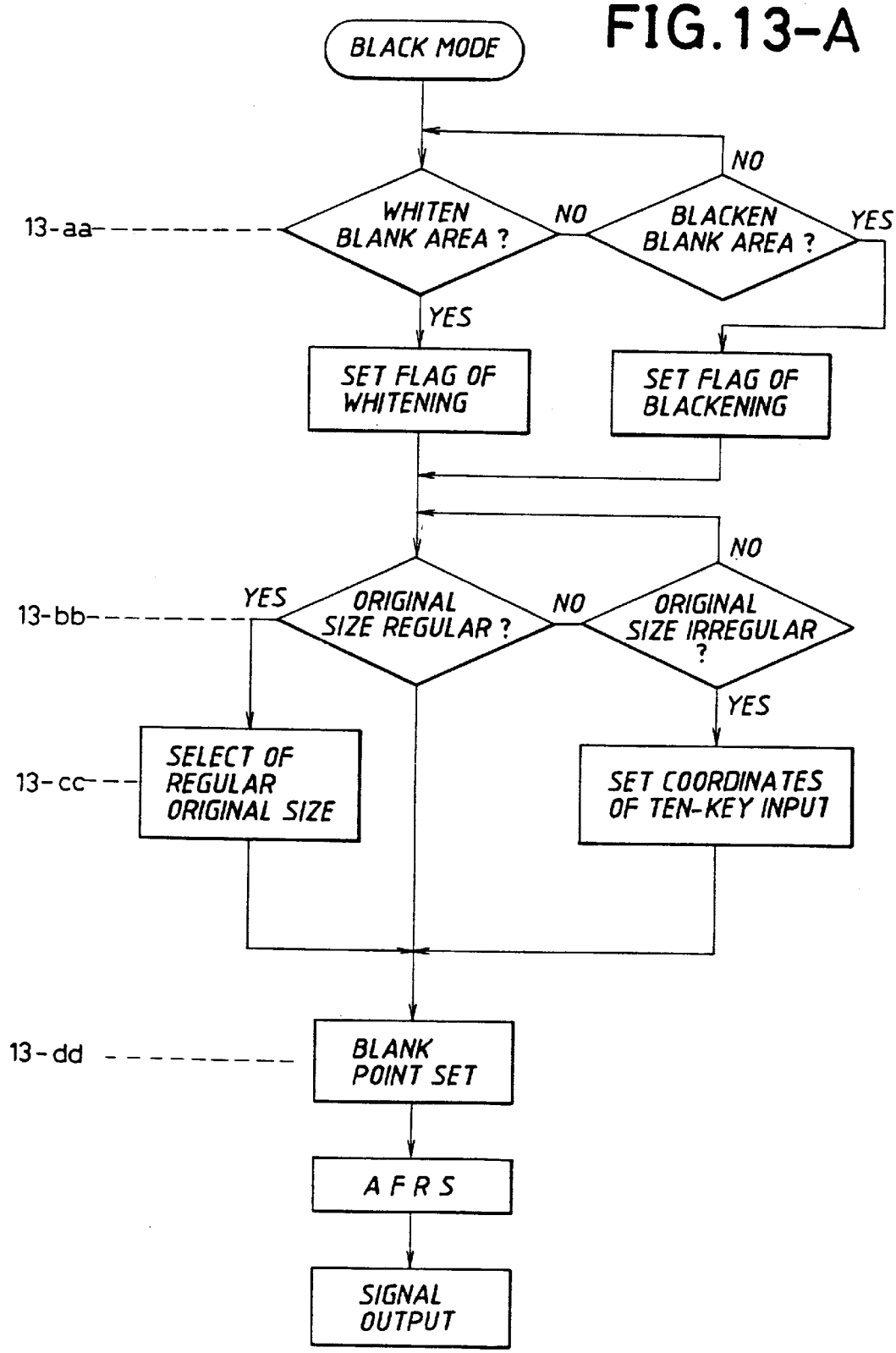
FIG.13-A

FIG. 13-B 13-a
```
| WHITE BLANK?  BLACK BLANK?        CLR |
| [SK1] [SK2] [SK3] [SK4] [SK5] [SK6]   |
```

13-b
```
| (ORIGINAL SIZE REGULAR?)  YES? NO? CLR |
| [SK1] [SK2] [SK3] [SK4] [SK5] [SK6]    |
```

13-c
```
| A6?   A5?   A4?   A3?   ETC   CLR |
| [SK1] [SK2] [SK3] [SK4] [SK5] [SK6] |
```

13-d
```
| B7?   B6?   B5?   B4?   ETC   CLR |
| [SK1] [SK2] [SK3] [SK4] [SK5] [SK6] |
```

13-e
```
| MINI?  LTR?  LGL?  LDR?  ETC  CLR |
| [SK1] [SK2] [SK3] [SK4] [SK5] [SK6] |
```

13-f
```
| X ___ mm     Y ___ mm         CLR |
| [SK1] [SK2] [SK3] [SK4] [SK5] [SK6] |
```

13-g
```
| WHITE BLANK!!!  AUTO 100%!!!      ETC |
| [SK1] [SK2] [SK3] [SK4] [SK5] [SK6]   |
```

FIG. 14-A
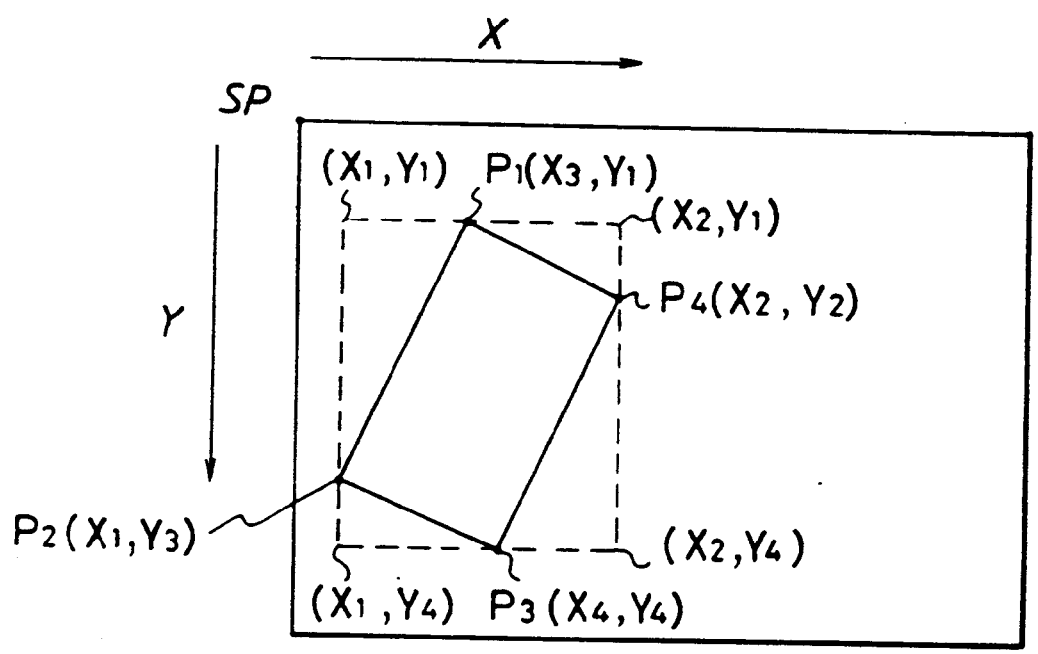

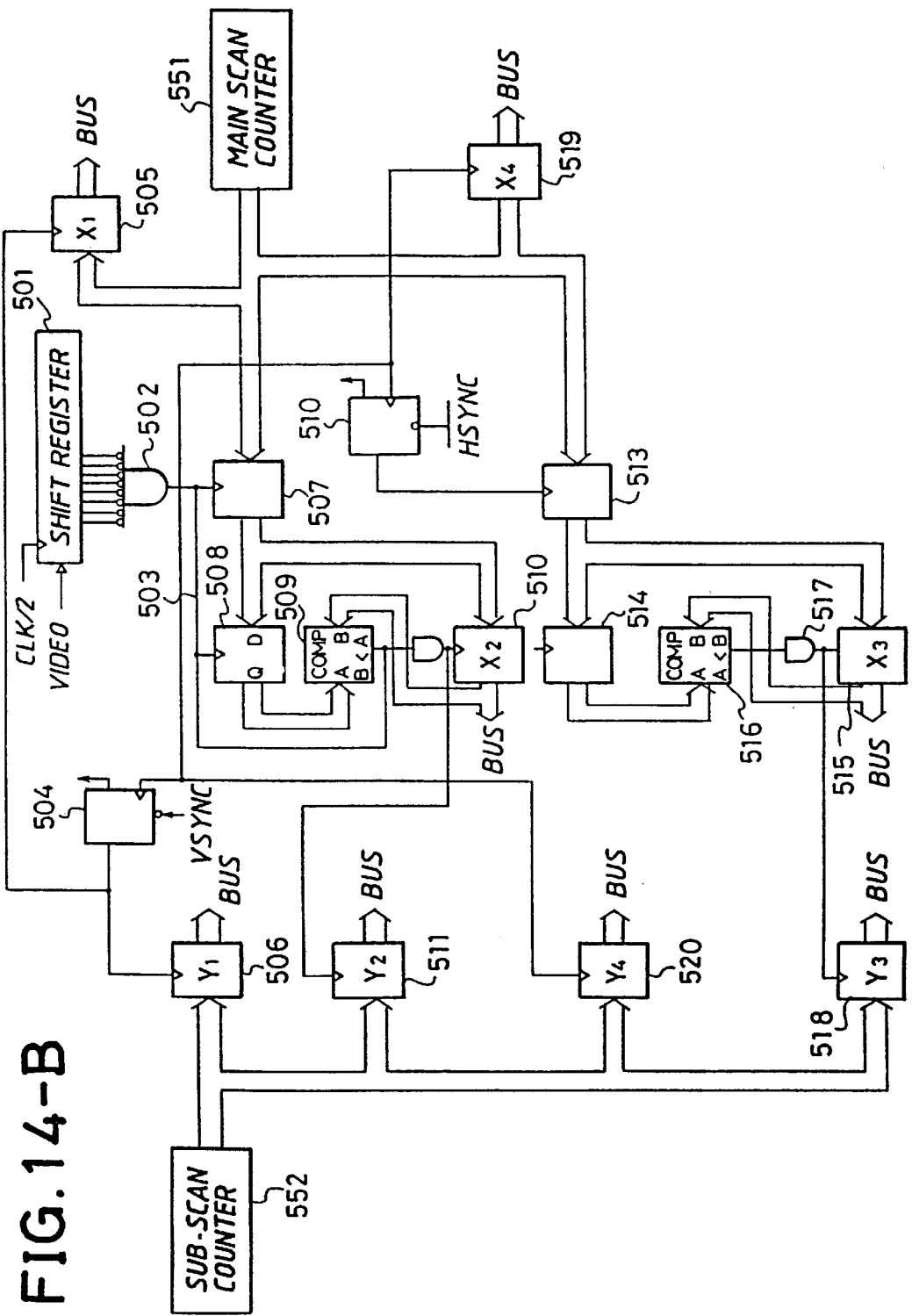
FIG.14-B

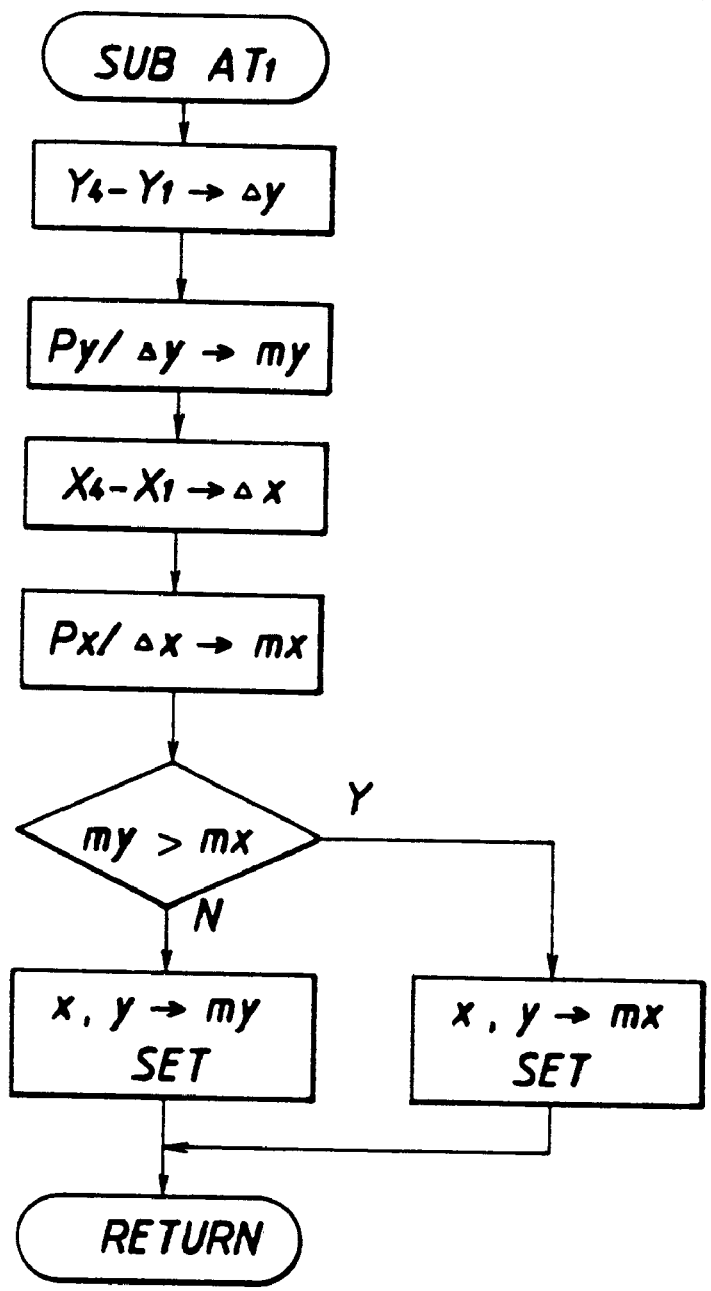
FIG. 14-C

FIG. 14-D
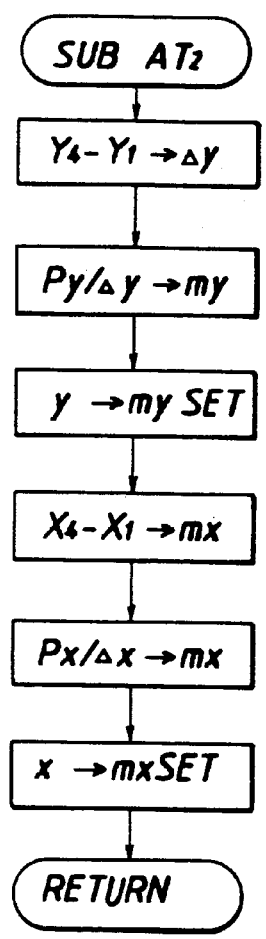
FIG. 14-E
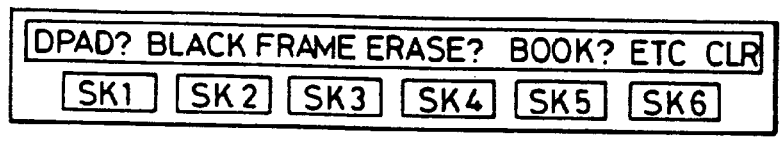

FIG. 15-A 15-a
(ORIGINAL SIZE REGULAR?) YES? NO? CLR
[SK1] [SK2] [SK3] [SK4] [SK5] [SK6]

15-b
A6? A5? A4? A3? ETC CLR
[SK1] [SK2] [SK3] [SK4] [SK5] [SK6]

15-c
B7? B6? B5? B4? ETC CLR
[SK1] [SK2] [SK3] [SK4] [SK5] [SK6]

15-d
MIN? LTR? LGL? LDR? ETC CLR
[SK1] [SK2] [SK3] [SK4] [SK5] [SK6]

15-e
(AFRS?) YES? NO? CLR
[SK1] [SK2] [SK3] [SK4] [SK5] [SK6]

15-f
BLACK FRAME ERASE!!! 100% ETC
[SK1] [SK2] [SK3] [SK4] [SK5] [SK6]

15-g
X___ mm Y___ mm CLR
[SK1] [SK2] [SK3] [SK4] [SK5] [SK6]

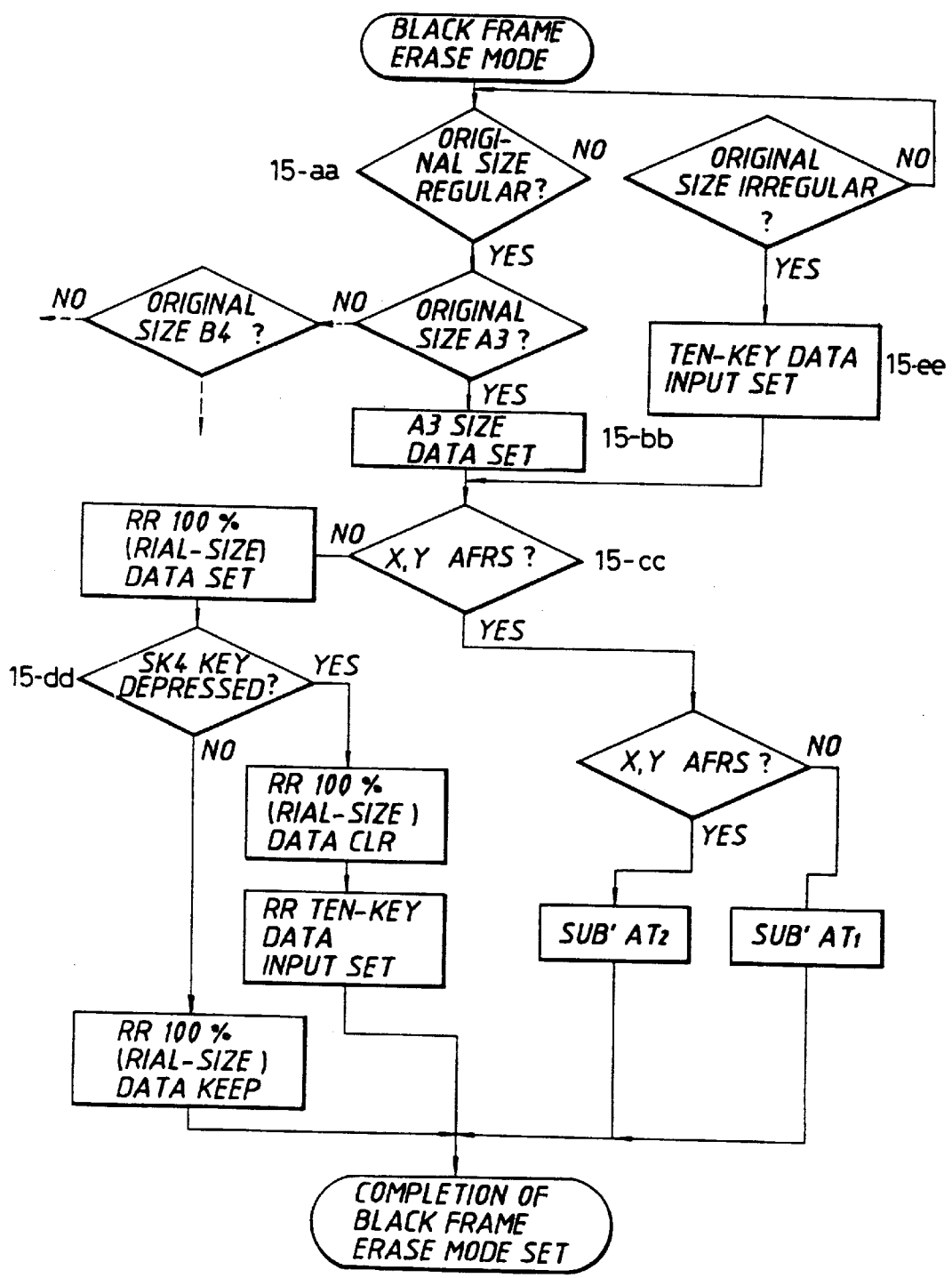
FIG.15-B

FIG.16-A(a)

|  FIG.16-A |
|---|
| FIG.16-A (a) | FIG.16-A (b) |

16-b
```
| HALF L? HALF R? HALF LR?   FULL? CLR |
| [SK1] [SK2] [SK3] [SK4] [SK5] [SK6]  |
```

16-c
```
| (BOOK SIZE REGULAR?)   YES? NO? CLR |
| [SK1] [SK2] [SK3] [SK4] [SK5] [SK6] |
```

16-d
```
| A6?  A5?  A4?        ETC  CLR |
| [SK1] [SK2] [SK3] [SK4] [SK5] [SK6] |
```

16-e
```
| B7?  B6?  B5?        ETC  CLR |
| [SK1] [SK2] [SK3] [SK4] [SK5] [SK6] |
```

16-f
```
| MIN ? LTR?           ETC  CLR |
| [SK1] [SK2] [SK3] [SK4] [SK5] [SK6] |
```

16-g
```
| X___mm     Y___mm         CLR |
| [SK1] [SK2] [SK3] [SK4] [SK5] [SK6] |
```

16-h
```
| X175mm     Y___mm         CLR |
| [SK1] [SK2] [SK3] [SK4] [SK5] [SK6] |
```

| FIG.16-A (a) | FIG.16-A (b) |

16-i
```
X 175mm   Y 250mm      OK       CLR
[SK1] [SK2] [SK3] [SK4] [SK5] [SK6]
```

16-j
```
(AFRS?)            YES? NO?  CLR
[SK1] [SK2] [SK3] [SK4] [SK5] [SK6]
```

16-k
```
(AFPS?)            YES? NO?  CLR
[SK1] [SK2] [SK3] [SK4] [SK5] [SK6]
```

16-ℓ
```
BOOK HALF LR!!!  AUTO120%*118%!!!  ETC
[SK1] [SK2] [SK3] [SK4] [SK5] [SK6]
```

16-m
```
BOOK HALF LR!!!   AUTO 118%!!!   ETC
[SK1] [SK2] [SK3] [SK4] [SK5] [SK6]
```

16-n
```
BOOK HALF LR!!!    100%!!!      ETC
[SK1] [SK2] [SK3] [SK4] [SK5] [SK6]
```

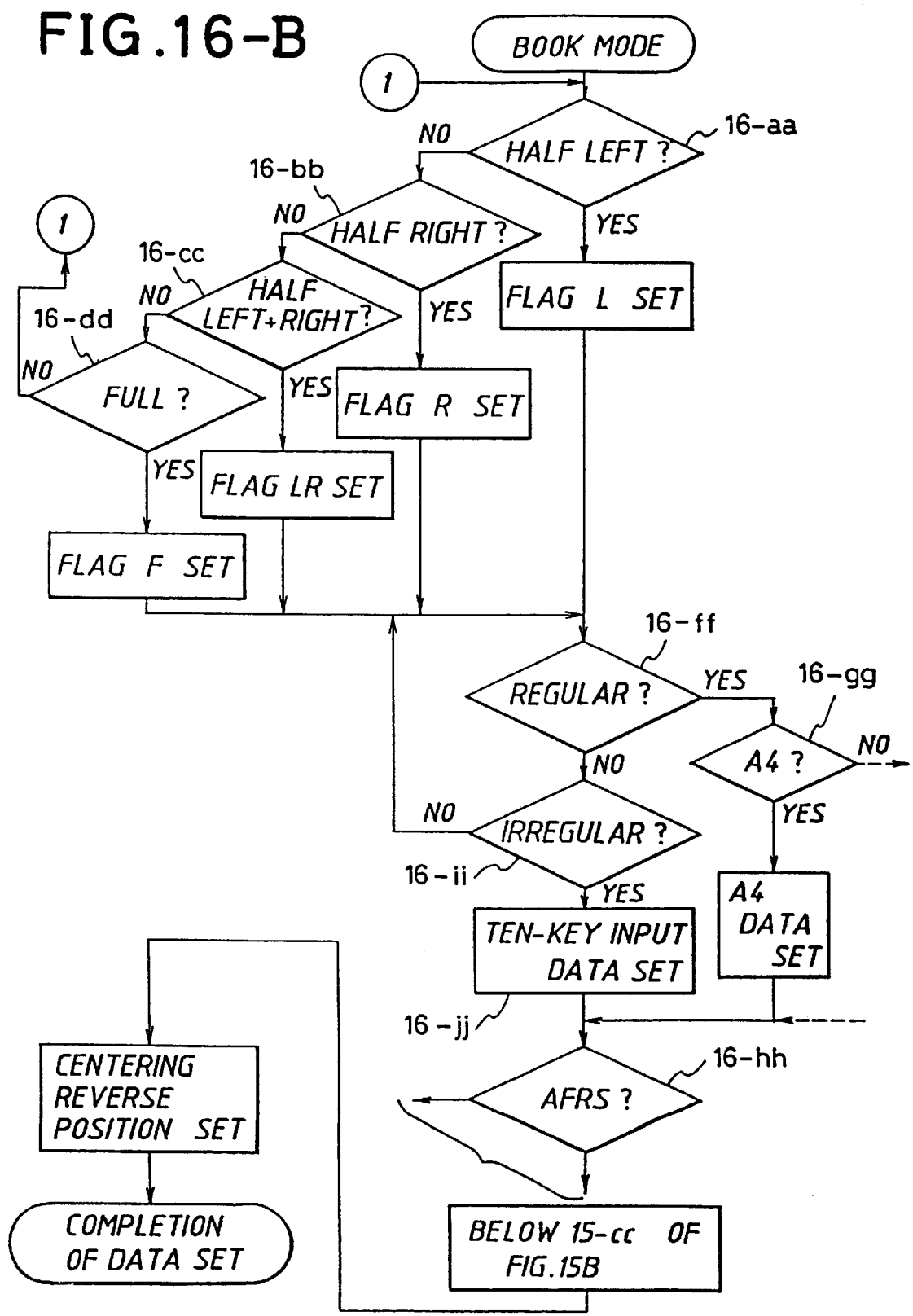
FIG.16-B

FIG. 16-C
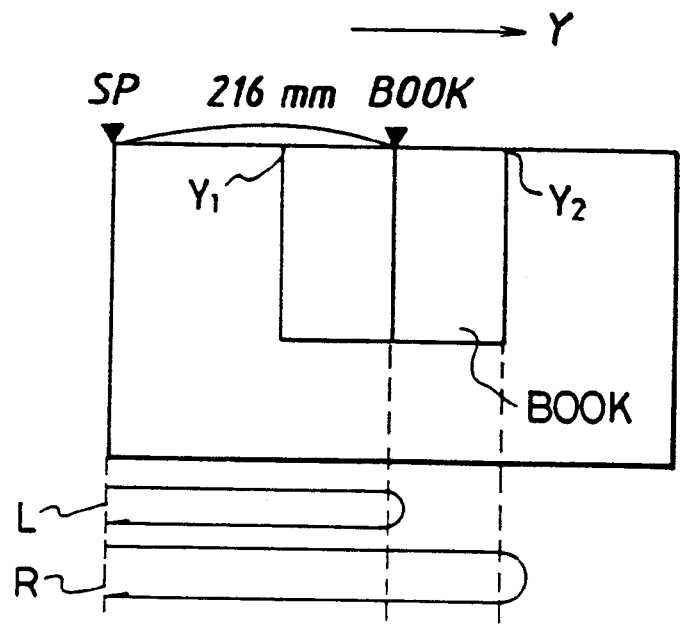
FIG. 17-A
| (REG DEST DESIG) | CLR |
| --- | --- |
| | SK6 |

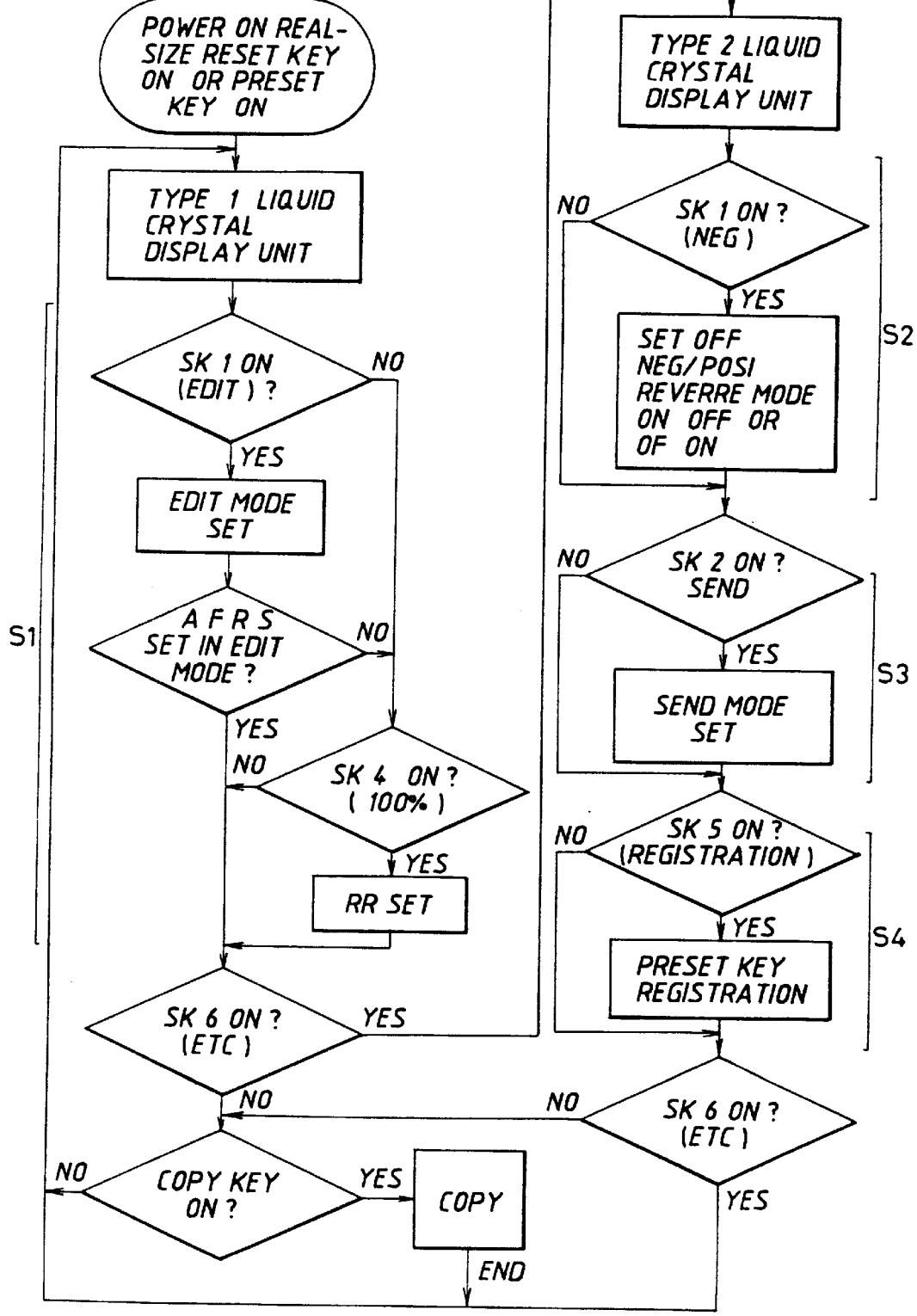

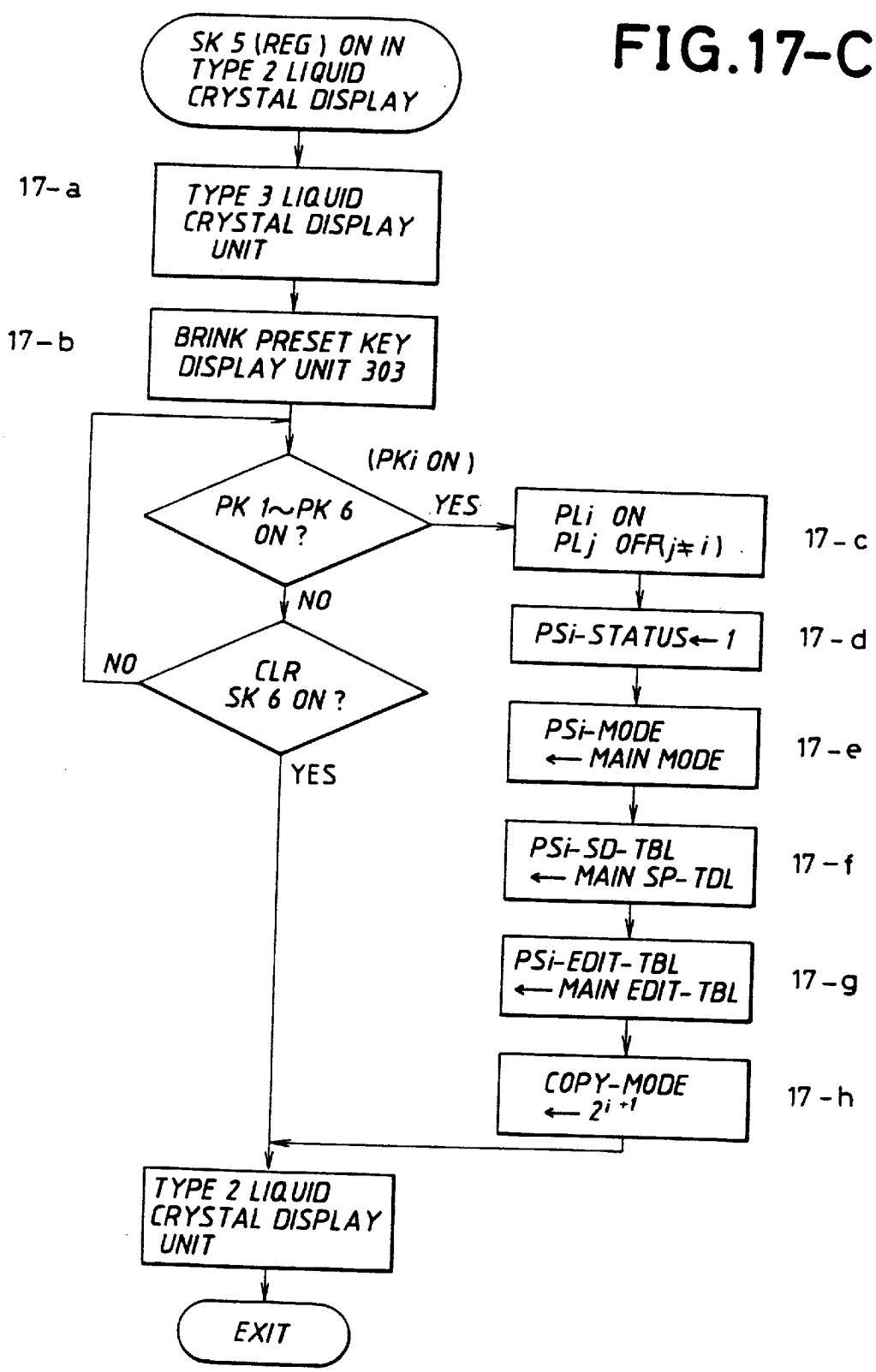
FIG.17-C

FIG. 17-D

| MAIN-MODE | 11 | NAMES OF 11 FLAGS |
|---|---|---|
| MAIN-NEGA | 1 | 1: NEGA/POSI REVERSE MODE  0: NON-REVERSE |
| MAIN-SEND | 1 | 0: LOCAL COPY MODE<br>1: SEND CODE TO ANY TERMINAL<br>2: SEND CODE TO PLURAL TERMINALS EXCLUDING SELF TERMINAL<br>3: SEND CODE TO PLURAL TERMINALS INCLUDING SELF TERMINAL |
| MAIN-EDIT | 1 | 0: EDIT MODE NON-SET<br>1: WHITE FRAME MODE            2: BLACK FRAME MODE<br>3: WHITE BLANK MODE            4: BLACK BLANK MODE<br>5: DPAD-HALF LR MODE            6: DPAD-HALF L MODE<br>7: DPAD-HALF LR MODE            8: DPAD-FULL MODE<br>9: BLACK FRAME ERASE MODE     10: BOOK-HALF LR MODE<br>11: BOOK-HALF L MODE           12: BOOK-HALF R MODE<br>13: BOOK-FULL MODE |
| MAIN-AUTO | 1 | 1: AFRS  0: NO AFRS |
| MAIN-MX | 1 | SUB-SCAN DIRECTION RR 50~200 |
| MAIN-MY | 1 | MAIN-SCAN DIRECTION RR 50~200 |
| MAIN-XY | 1 | 1: SUB-SCAN DIRECTION RR ≠ MAIN-SCAN DIRECTION RR<br>0: SUB-SCAN DIRECTION RR = MAIN-SCAN DIRECTION R |
| MAIN-SIZE | 1 | PAPER SIZE CODE |
| MAIN-DOC | 1 | 0: CHARACTER  1: HT  2: MIXTURE  3: LINE |
| MAIN-QTY | 1 | COPY NUMBER |
| MAIN-DNS | 1 | DENSITY REGULATE LEVEL |

FIG. 17-E

| | | |
|---|---|---|
| PSi -MODE<br>i = 1~6 | EVERY 11 TOTAL 6 | NAMES OF 11 FLAGS |
| PSi -NEGA<br>i = 1~6 | EVERY 1 TOTAL 6 | THE SAME AS MAIN-NEGA |
| PSi -SEND<br>i = 1~6 | EVERY 1 TOTAL 6 | THE SAME AS MAIN-SEND |
| PSi -EDIT<br>i = 1~6 | EVERY 1 TOTAL 6 | THE SAME AS MAIN-EDIT |
| PSi -AUTO<br>i = 1~6 | EVERY 1 TOTAL 6 | THE SAME AS MAIN-AUTO |
| PSi -MX<br>i = 1~6 | EVERY 1 TOTAL 6 | THE SAME AS MAIN-MX |
| PSi -MY<br>i = 1~6 | EVERY 1 TOTAL 6 | THE SAME AS MAIN-MY |
| PSi -XY<br>i = 1~6 | EVERY 1 TOTAL 6 | THE SAME AS MAIN-XY |
| PSi -SIZE<br>i = 1~6 | EVERY 1 TOTAL 6 | THE SAME AS MAIN-SIZE |
| PSi -DOC<br>i = 1~6 | EVERY 1 TOTAL 6 | THE SAME AS MAIN-DOC |
| PSi -QTY<br>i = 1~6 | EVERY 1 TOTAL 6 | THE SAME AS MAIN-QTY |
| PSi -DNS<br>i = 1~6 | EVERY 1 TOTAL 6 | THE SAME AS MAIN-DNS |

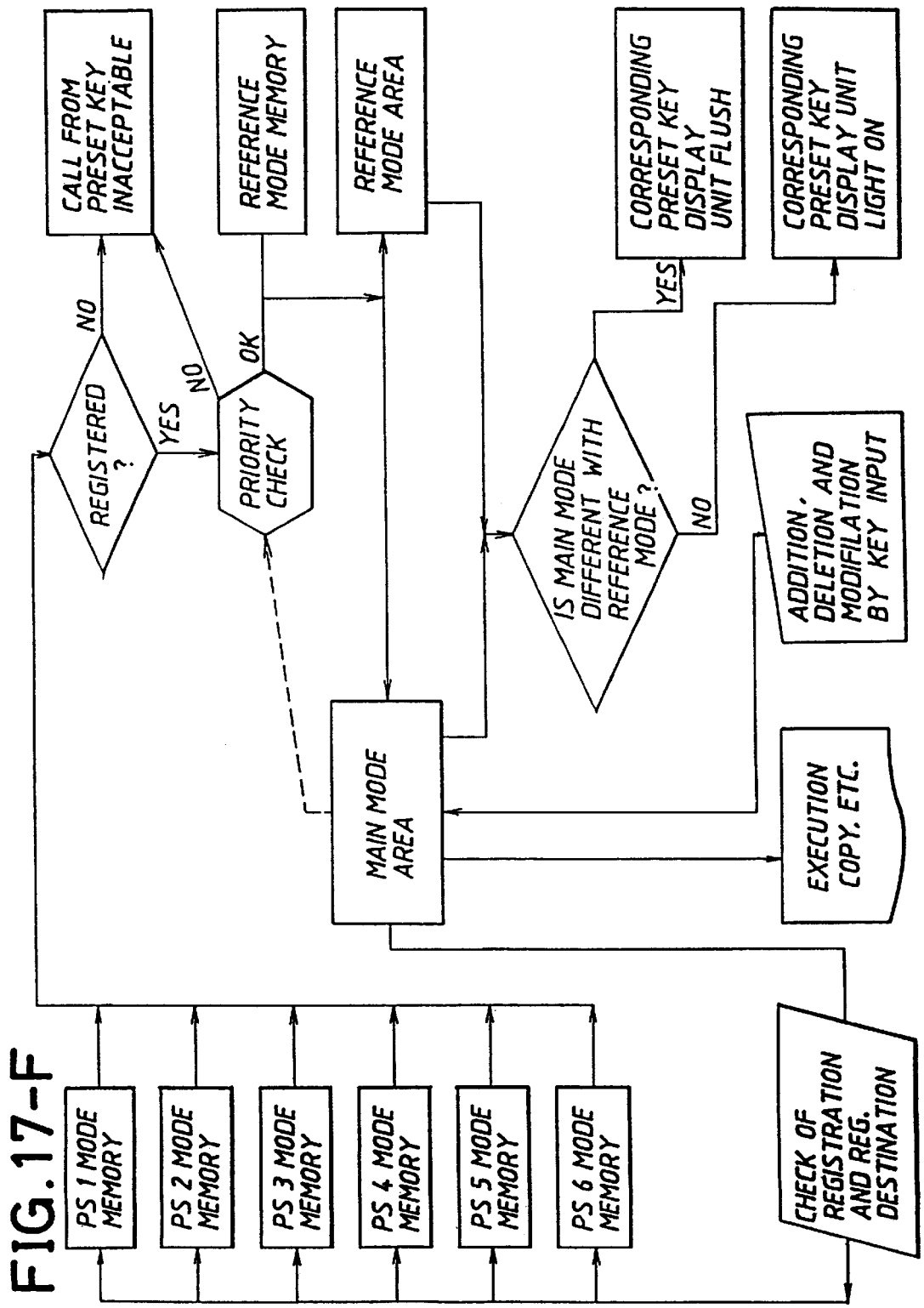
FIG.17-F

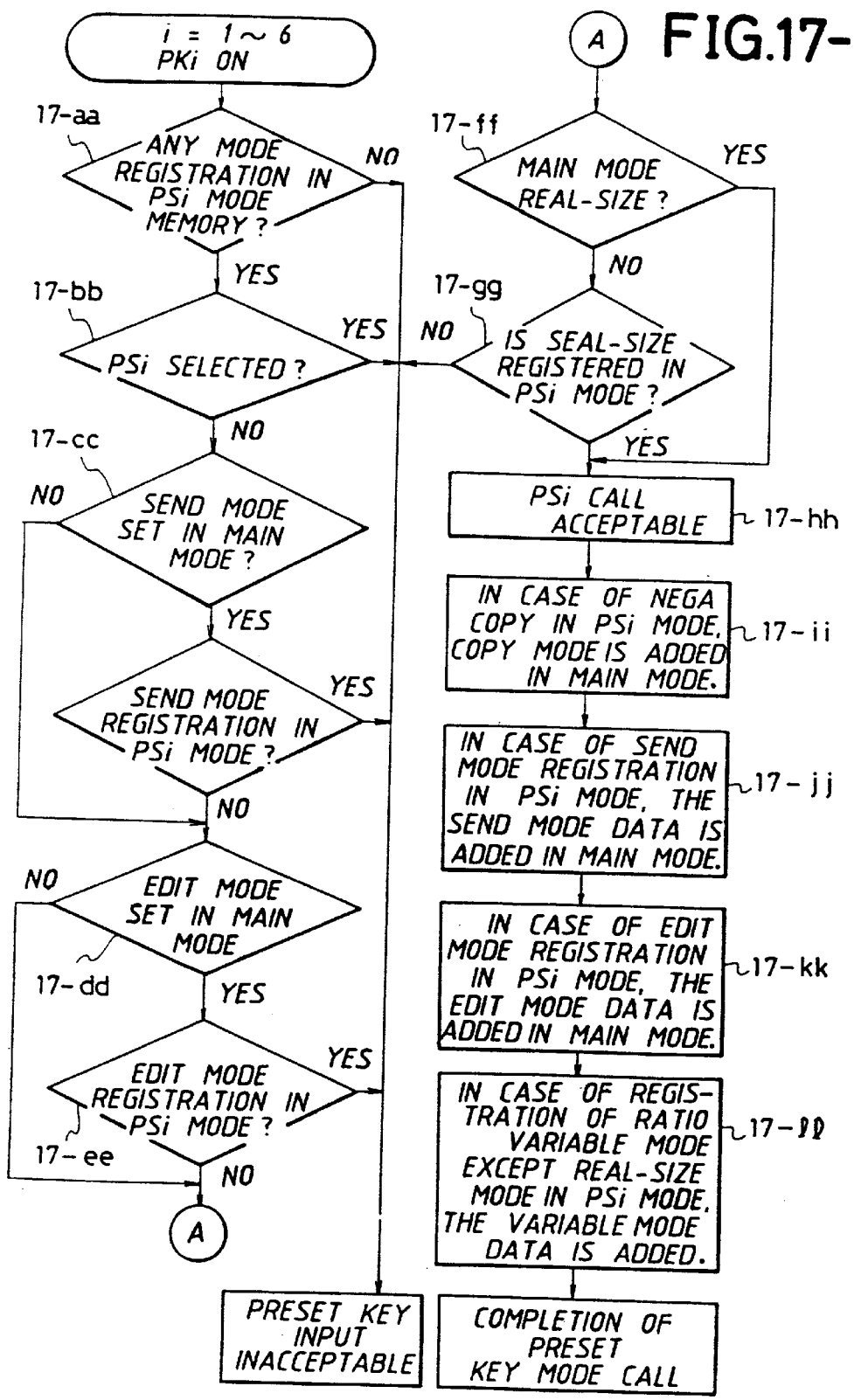
FIG.17-G

IMAGE PROCESSING SYSTEM

This application is a division of application Ser. No. 08/197,451 filed Feb. 16, 1994, now U.S. Pat. No. 5,977,954 which is a continuation of application Ser. No. 08/021,721 filed Feb. 23, 1993, now abandoned, which is a continuation of application Ser. No. 07/566,310 filed Aug. 13, 1990, now abandoned, which is a continuation of application Ser. No. 07/110,538 filed Oct. 20, 1987, now abandoned, which is a continuation of application Ser. No. 06/536,982 filed Sep. 29, 1983, now abandoned.

BACKGROUND OF THE INVENTION

1. Field of the Invention

The present invention relates to an image processing system such as a facsimile, copier, electronic mailing system and the like.

2. Description of the Prior Art

Conventionally, an image processing device or copier has been of the type in which a document or a printed text is simply reproduced faithfully. Even a recently developed copier of multi-function type merely has such a small number of functions as to reduce or enlarge a printed text at a fixed reproduction ratio, to automatically feed the printed text, and to automatically align the documents. These functions are mechanically controlled and hence it could be asserted that further multi-functionalization of a copier is hardly expected for reasons of physical limits and the like. Thus, the operating device of the copier simply displays the selected status of functions corresponding to individual keys at the rate of 1:1 by lighting LEDs corresponding to individual keys and switches or in accordance with the selected positional status of individual keys and switches. However, in recent years, with the progress of systematization, there has been proposed an image processing device having image control function, image transfer function and picture quality processing function with the use of photoelectric conversion elements. Consequently, when an operating unit of the type in which each key corresponds to each function at the rate of 1:1 in proportion thereto is used, drawbacks such as the device being enlarged and the operation being complicated, are associated.

SUMMARY OF THE INVENTION

The present invention has been contemplated in view of the above mentioned points.

Accordingly, an object of the present invention is to provide an image processing system which is provided with a highly available and usable operation unit.

Another object of the present invention is to provide an image processing system which is provided with an improved operation unit adapted to input image processing procedure.

Still another object of the present invention is to provide an image processing system which is provided with an operation unit which is capable of reducing errors in inputting the image processing procedure as much as possible.

Still another object of the present invention is to provide an image processing system which is provided with an operation unit which is capable of inputting as large a number of image processing procedures as possible with the use of as few keys and displays as possible.

Still another object of the present invention is to provide an image processing system which is provided with an operation unit which is suitable for image transfer.

Still another object of the present invention is to provide an image processing system which is provided with an operation unit which is suited to receive and print an image.

The above and further objects of the present invention will be apparent from the following description with reference to the accompanying drawings.

BRIEF DESCRIPTION OF THE DRAWINGS

FIG. 1-A is an entire outside view of a copier;

FIG. 1-B shows the entire structure of the copier;

FIG. 2 shows an operation unit in FIGS. 1-A and 1-B;

FIG. 3 is a detailed view of displays and function keys;

FIG. 4 is a partial enlarged view of the display shown by dotted line in FIG. 3;

FIG. 5 is a block diagram of a display;

FIG. 6-A is a detailed view of a driver 4 in FIG. 5;

FIG. 6-B is a flowchart for setting various functions and FIG. 6-C is its status transition diagram;

FIGS. 6-D($a$), 6-D($b$), and 6-D($c$) are a flowchart for setting a reproduction ratio and FIGS. 6-E($a$) and 6-E($b$) are its status transition diagram;

FIG. 7-A is a diagram illustrating the display status when a power source is turned on or a real size reset key is pressed;

FIG. 7-B shows the kinds of characters displayed in a display area of edit mode names;

FIG. 7-C shows a character displayed in an auto display area;

FIG. 7-D shows characters displayed in a reproduction ratio display area;

FIG. 8-A shows one of the transition states from FIG. 7-A;

FIG. 8-B shows characters displayed on a portion of FIG. 8-A;

FIG. 8-C shows characters displayed on a portion of FIG. 8-A;

FIG. 9-A shows a display state which is shifted when a key SK 4 is pressed in FIG. 7-A;

FIG. 9-B is a flowchart for setting the reproduction ratio change mode;

FIGS. 9-C and 9-D show display states in the reproduction ratio change mode;

FIG. 10-A is a flowchart for the send mode;

FIG. 10-B shows display states shifted when a key SK 2 is pressed in FIG. 8-A;

FIGS. 11-A($a$) and 11-A($b$) are flowcharts for setting the frame mode;

FIG. 11-B shows display states shifted at the step 11-$b$ in FIGS. 11-A($a$) and 11-A($b$);

FIG. 12-A shows the state that a document is placed on a document support;

FIG. 12-B shows a document 12-$a$ on which the frame point is set;

FIG. 12-C shows the document on which the shift destination of the frame area is set;

FIG. 12-D shows the document on which the origin of the frame area is shifted;

FIG. 12-E shows the document on which the frame area thus shifted is reduced;

FIG. 12-F shows the document on which the frame area thus shifted is enlarged;

FIG. 12-G is a flowchart illustrating the procedure of shift to center;

FIG. 12-H shows the copied position of the document which is shifted to center (doubled in size);

FIG. 13-A is a flow chart for the blank mode;

FIG. 13-B shows the transition states of a display obtained when a key SK 3 is pressed in the display state 11-*aa* in FIG. 11-B;

FIG. 14-A shows the state that a document is placed on the document support;

FIG. 14-B is a circuit diagram of DPAD;

FIG. 14-C is a flowchart for auto fixed ratio scaling in DPAD mode;

FIG. 14-D is a flowchart for auto full page scaling in DPAD mode;

FIG. 14-E shows a display state obtained when the key SK 5 is pressed in the display state 11-*aa* in FIG. 11-B;

FIG. 15-A shows the black frame erase mode display states when the key SK 2 is pressed in the display state in FIG. 14-E;

FIG. 15-B is a flowchart for the black frame erase mode;

FIGS. 16-A(*a*) and 16-A(*b*) show the book mode display states when the key SK 4 is pressed in FIG. 14-E;

FIG. 16-B is a flowchart for setting the book mode;

FIG. 16-C shows the relative position between the book and the document support;

FIG. 17-A shows a display state when the key SK 5 is pressed in the display state in FIG. 8-A;

FIG. 17-B is a flowchart of the functions of a copier according to an embodiment of the present invention;

FIG. 17-C is a flowchart for registration;

FIG. 17-D shows flags of main modes on a RAM;

FIG. 17-E shows flags of preset modes on the RAM;

FIG. 17-F is an illustration when registered modes are called by means of preset keys;

FIG. 17-G is a flowchart for calling the registered modes by means of preset keys.

DETAILED DESCRIPTION OF THE INVENTION

Figure 18:
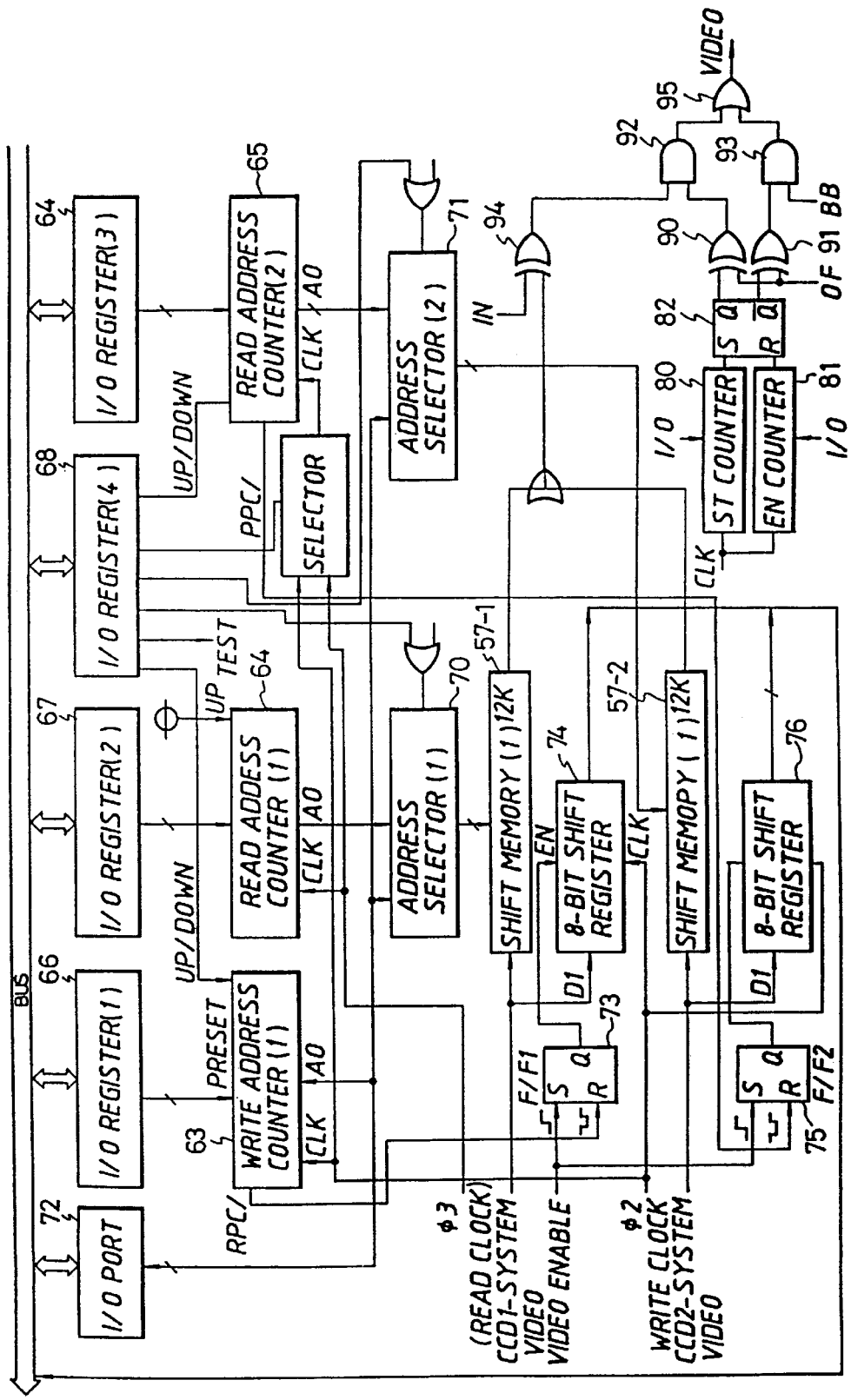
FIG. 18 is a circuit diagram of an image data processing circuit.

The present invention will be described in detail hereinafter with reference to the accompanying drawings.

Reference is now made to FIG. 1-A in which is shown the outside view of a copier and an operation unit thereof, that is, an embodiment of an image processing system according to the present invention. This system is basically constituted by two units, that is, a reader A and a printer B. These units are mechanically and functionally separated from each other so that either one of them can be used alone. These units are connected by a cable or the like. The reader A is provided with an operation device A-1.

FIG. 1-B is a sectional view showing the structure of the copier and the operation device thereof according to this embodiment of the present invention. A document or a printed text is placed face down on a support glass 903 and its setting basis is at the left inner portion viewing from the front. A light path along which light reflected from the document which is irradiated with a fluorescent lamp 902 is directed by mirrors 905, 907 and a lens 906 and focused on the surface of CCD 901 is formed. The mirrors 907 and 905 are so made as to move at the relative speed of 2:1. This optical unit is moved from left to right at a constant speed by a DC servomotor while emitting PLL. This moving speed is 180 mm/sec on an outward trip during which the document is being irradiated and 468 mm/sec on a backward trip. The degree of resolution in this sub-scanning direction is 16 lines/mm. Documents of the size from A5 to A3 can be processed. And A5, B5, and A4 sized documents are placed lengthwise, while B4 and A3 sized documents are placed sideways. Three optical unit return positions are provided in accordance with the size of documents. The first point (for A5, B5, and A4) is 220 mm away from the document reference position, the second point (for B4) is 364 mm off, and the third point (for A3) is 431.8 mm off.

On the other hand, the main scanning width is up to 297 mm (corresponding to the width of the A4-sized documents) in accordance with the orientation of documents. In order to resolve the area of this width at 16 lines/mm, 4752 (=297× 16) bits are required for CCD, so that in this device, two 2628-bit CCD array sensors which are driven in parallel with each other are used. Thus, from the condition of 16 lines/mm, 180 mm/sec, the main scanning period (corresponding to the storage time of CCD) is $$T = \frac{1}{v \cdot n} = \frac{1}{180 \times 16} = 347.2 \ \mu sec.$$

The transfer speed of CCD is $$F = \frac{N}{T} = \frac{2628}{347.2 \ \mu sec} = 7.569 \ MHZ.$$

Next, referring to FIGS. 1-A and 1-B, the printer which is placed under the reader will be outlined. An image signal which is processed in the reader unit into a bit serial form is inputted into a laser scanning optical unit 925 in the printer. This unit is comprised of a semiconductor laser, a collimator lens, a polyhedron rotating mirror, and F Θ lens, and an overturn correction optical system. The image signal from the reader is applied to the semiconductor laser in which the signal is then electrooptically converted and a laser light which is emitted from the laser is converted into a parallel light by the collimator lens and irradiated to the polyhedron mirror which is rotated at a high speed, by which the laser light scans a light sensitive element 908. The polyhedron mirror is rotated at 2,600 rpm. The scanning width thereof is about 400 mm and the effective width of the image is 297 mm corresponding to the width of the A4-sized document. Accordingly, the frequency of signal which is applied to the semiconductor laser at this time is about 20 MHZ (NRz). The laser light from this unit is directed through a mirror 924 to the light sensitive element 908.

This light sensitive element 908 consists of, for example, three layers, electro-conductive layer-light sensitive layer-insulating layer. Thus, there is provided a process component which permits the three layers to form an image. In the component, 909 is a pre-rejector, 910 is a pre-rejector lamp, 911 is a primary charger, 912 is a secondary charger, 913 is a front exposure lamp, 914 is a developer, 915 is a paper feed cassette, 916 is a paper feed roller, 917 is a paper feed guide, 918 is a resist roller, 919 is a transfer charger, 920 is a separate roller, 921 is a carrier guide, 922 is a fixer, and 923 is a tray. The speed of the light sensitive element 908 and the carrier system is 180 mm/sec which is the same as that of the reader on the outward trip. Thus, the speed at which the combination of the reader with the printer makes a copy is 30 sheets/min for A4-sized documents. The printer is provided on this side with a separating belt for separating a copy paper which is adhered to a light sensitive drum, so that an image portion which corresponds to the width of the belt is missing. If the signal is also sent on that portion, the portion is developed and the separate belt is stained with a toner in the developer, as a result of which the succeeding papers are also stained. Therefore, it is so constructed that a portion of a video electric signal of a print output which corresponds to the separate belt width of 8 mm is cut out in advance in the reader. In addition, if the toner sticks to the leading edge of the copy paper, the paper will be wound on the fixed roller when the toner is fixed and jamming will occur. Therefore, a portion of the electric signal is also cut out so as to prevent the toner from adhering to the paper leading edge of 2 mm in width.

In the device according to this embodiment, the image information is in the form of electric signals, in that even though the reader and the printer are separated from each other and have separate functions, image information transmission is possible between these units. In the communication, when the reader and the printer are used as a unit or only the reader is used, a communication module may be provided on the reader side, while when only the printer is used, the module may be provided on the printer side, and these units may be connected in a looped configuration for inside-the-compound local communication. For outside-the-compound communication, a gateway (an interface between public lines and local network) may be disposed on the loop. In addition, the electronic mail system may be provided between the head office building and branch buildings by linking networks with copier units.

Next, the functions obtained by the copier and the operation unit thereof according to this embodiment of the present invention will be described. In addition to the usual function as a copier, this device has such various functions as a reproduction ratio change function for optionally enlarging or reducing the size of a copied image, an edit function for picking up or deleting any portion of a document, and a function for automatically detecting the size and the position of a document to automatically vary the reproduction ratio or edit the document. Such functions for operating the image on a document are generally called the "image operating functions". In addition, this device not only can make a copy of the document image which is read by the connected printer but also can transmit the document image to other printers through a CCU (communication control unit). Further, receiving the document image which is sent from another reader by the printer at hand is possible. Such a function is called the "image transfer function". Any selected function or functions as mentioned above can be optionally registered in six preset keys. The registered content can be optionally selected by a user and is still maintained after the power source is turned off. Such a function is called the "preset function". Further, the device possesses an automatic exposure function for shading off the background of the document and an intermediate-gradation processing function for outputting an image with gradation such as a photograph highly reproducibly. These are generally called "picture quality processing functions". Summarizing the above matters, in the image operating functions, there are included the following five functions.

As the reproduction ratio change functions, there are real size (Reproduction Ratio 100%), fixed reproduction ratio selection (Size Sel.), infinite reproduction ratio change (Reproduction Ratio Select (R.R.Sel.) 50 to 200%), and independent reproduction ratio change in X and Y directions (R.R.C. X/Y in main and sub-scanning directions).

As the image reverse functions, there are original image (ORIGINAL), and negative/positive reverse image (NEG/POS).

As the edit functions, there are non-editing (NON-ED), white blank (White), and black blank (Black). However, the latter two functions automatically turn into auto full page scaling (A.F.P.S.) and the setting of any other functions is impossible. Further, there are white frame (White), black frame (Black), and document position auto detection (DPAD). However, the R.R.C., image reverse, shift and special R.R.C. functions are associated therewith.

As the shift functions, there are Non-Shift, shift destination designation (S.S.D.), shift to corner (COR.), and shift to center (CENT.).

As the special R.R.C. functions, there are non-select (NON-Sel.), auto fixed ratio scaling (A.F.R.S.) and auto full page scaling (A.F.P.S.), in which the latter two functions cannot designate other R.R.C. functions. The shift and special reproduction ratio change functions are effective only when white/black frame and DPAD functions are designated.

In the image transfer functions, there are included Local Copy (usual copying), Send (to send the document image to another printer through a CCU), and Receive (to receive the document image from another reader through CCU).

And, in the preset functions, there are Register (to store in the preset key) and Read (to read out the content stored in the preset key). The preset key portion also includes a reset function to return to any standard mode.

In the image quality processing functions, there are auto expose (A.E.) and intergradation process.

FIG. 2 is a detailed view of the operating unit A-1 in FIG. 1. This operating unit is roughly divided into three blocks: 100 is a general purpose key portion for the conventional copier, 200 is a soft key portion by which an user can optionally create copy transmission functions, and 300 in the center block is a function key preset key portion which is used to register, read and reset the copy transmission functions and the like which are optionally created by the user. The general purpose key portion 100 is of the type which is used in the conventional copier. 101 is a copy button. 102($a$–$f$) are alarm displays (conventionally used in the copier and the like), in which 102$f$ is an interrupt display. 103 is a display unit to display the desired set number of copies and the remaining number of copies. 104 is copy density switch levers and displays thereof. Alternatively, an up/down key may be used to control the density. 105 is selection displays for document images including only characters, only half tone (Ht), the combination of halftone and lines, and section papers. These displays are provided to process the document image in such a manner that it can be copied in the optimized state. 106 is a display adapted to display whether the selected cassette stage is an upper one or lower one. 107 is a display adapted to display the size of papers stored in the selected cassette stage. 108 is a ten key group from 0 to 9 which is used to set the sheet number at the sheet number display and used for the entry of values (for example, the changed reproduction ratio and the a destination addressing) during programming at the soft key portion 200. 114 is a clear reset key for clearing the data inputted through ten key group 108 and clearing the message displayed on the display portion 202. And an entry key 109 is provided as a key entry confirmation key. The entry key 109 is adapted to confirm data and to switch the display 103 to display the number of copies or the reproduction ratio. 110 is an interruption key, 111 is a copy clear (Clr.) key, 112 is a cassette stage switching key, 113 is a document image switching key. The preset key portion 300 is of a label writable structure into which the designation of function created by the user is written as a label. 302 is a group of six preset keys by which the user registers six kinds of functions. 303 is a preset key display on which the position of preset key is displayed. 301 is a standard mode (real size reset mode) return key. A soft key portion 200 includes function keys 201 (SK 1 to SK 6) and displays 202 for message, function key label and other modes and data.

The embodiment of the present invention is a liquid crystal display.

FIG. 3 is a detailed view of the displays 202 and the function keys 201. Each display 202 utilizes a liquid crystal display on which 5×7 dots are arranged in a matrix for 32 characters. The displays 202 may be placed flush with the function keys 201.

FIG. 4 is an enlarged view of one character (surrounded by dots) in FIG. 3. In FIG. 4, liquid crystal display 5×7 dot portion 1 and an under bar 2 are illustrated. The number of dots and characters may be increased as required.

FIG. 5 is a block diagram of the liquid crystal display according to the embodiment of the present invention, in which 3 is a controller for liquid crystal display adapted to judge the key data from a key entry portion 5 and to send displayed liquid crystal address and displayed character data to a liquid crystal driver 4 through a line D. FIG. 6-A is a detailed view of the driver 4, in which 6 is a peripheral CPU for liquid crystal display which is included in the driver 4 in FIG. 5. As is apparent from FIG. 6-A, the driver drives the liquid crystal displays 202 in a matrix. That is, a set of four drivers including the peripheral CPU 6 is actually provided and 40 lines longitudinally extend from each driver, so that there exist 160 vertical lines. While, in 16 lines from COM 1 to COM 16 of the peripheral CPU 6, 8 lines are used for driving. The driver 4 drives 32 sets (160×8 dots) of liquid crystal display 5×8 dots in FIGS. 3 and 4 by means of 160×8 lines to cause the liquid crystal to display characters in accordance with the address data from the controller 3. The number of dots and displays may be varied depending on a language used. 7 is a main CPU for taking charge of various controls of the copier and the description of the main CPU itself is omitted here. The embodiment of the present invention is constructed as mentioned above.

The aspects of display will be briefly described hereinbelow.

In FIG. 3, the data to be displayed on the liquid crystal displays 202 are roughly divided into key labels of the function keys 201 (SK 1 to SK 6), messages to an operator, and input data from ten key group 108. In order to distinguish the soft key label from the message, a brace is added and the under bar blinks when the input from ten key group 108 is requested.

In order to distinguish the selected and unselected soft key label items, a question mark (symbol) is added after the label if unselected and an exclamation is added if selected. Therefore, a flag indicative of the selected function is provided for each function and the controller 3 turns on the flag when the function selection is completed.

Next, in the selection of copy functions with the use of the soft keys 200, various soft key labels are displayed on the liquid crystal label displays 202, so that typical soft key labels used in common for individual functions are shown in Table 1.

TABLE 1

| Soft Key Label | Function |
| --- | --- |
| ETC | To call the selection limbs and set-up items which are not being displayed on LCD. To return to the initial display. |
| YES, NO | To answer to the displayed messages and go forward. |
| OK | To accomplish the function set-up requiring the input from the ten key. |
| Confirm | To confirm the content of copy mode. To confirm the content which is to be set during setting and registering functions. (Although the modification is possible during the confirmation, the addition is impossible because only the function which is established is displayed unlike Option.) |
| Option | To perform deletion, alteration and addition of the copy mode content. |
| Explain | To confirm as to what kind of input the display is waiting for or how it is inputted when the display is in an input waiting state. |

With respect to the above mentioned functions, the operation of display will be described in detail hereinbelow.

With the power on, or in a state that each copying state is cancelled, the liquid crystal display 202 is in the reset mode, that is, in a normal copying state and the reproduction ratio is 100%, the aspect of display in this state being shown in the transition state 7-1 in FIG. 6-C, then the display 202 becomes in the option mode when the copy functions such as Copy Reproduction Ratio change are added or changed by the soft key 200 in FIG. 2.

Then, with reference to the state transition diagram in FIG. 6-C and the flowchart in FIG. 6-B, the aspects of display after in the reset mode will be described. It should be noted that in the reset mode display state, the key entry is not acceptable even though $F_1$ key corresponding to "Reset" (a message) is pressed. In the reset mode display states (5.1, 5.2) in the transition state 7-1 in FIG. 6-C, pressing the soft key $F_6$ labeled "Option" (5.3) provides the display of the transition state 7-2 and items which can be added or altered to the reset state are displayed as the soft key labels (5.4). In the transition state 7-2, the remaining soft key labels are displayed as shown in the transition state 7-3 by pressing the soft key label "ETC" (5.6). Then "ETC" is again inputted to return to the reset mode display state in the transition state 7-1 if no Option soft key label to be displayed exists (5.7).

The entry of the soft key for Option label which is intended to be selected in the display state of the transition state 7-2 permits the selection of option of interest (5.8).

The setting procedure of individual options will be described in more detail later.

At the completion of the establishment of individual options, the display returns to the set-up starting state of the transition state 7-2 or 7-3.

In case of the entry of "Neg." soft key in the transition state 7-3, for example, the operation unit establishes the copy function White Black Reverse Image Create. Then, the display changes as shown in the transition state 7-4 and alters the question mark after the soft key label to the exclamation mark in order to display that the Neg. input is set. Then, the key "ETC" is input in the transition state 7-4, it changes from the state 7-4 to the state 7-1' as in the case of returning from the state 7-3 to the state 7-1. Although the transition state 7-1' is the same as the state 7-1 in hierarchy, in the state 7-1', the reset mode is displayed as Option because the option function has been established. This state is called the option mode. However, if an option function which is established with the exclamation mark is to be changed, the function change is possible by inputting a soft key for its soft key label but it is impossible when the alteration is not allowed due to the content of the other established option functions. For example, in the transition state 7-2, "Edit" is the abbreviation of Edit Function Select and if the reproduction ratio can be determined solely by the selection of this edit function, the entry of the soft key F4 which means the alteration of the reproduction ratio is not accepted and the display flickers EXCLAMATION MARK "!" of the soft key label of interest as a means for displaying that the alteration is impossible. In the above mentioned example, it flickers "!" of the soft key label "□→□!", indicative of real size in the transition state 7-2 (5.1).

In order to return from the option mode to the reset mode, the reset key 301 in FIG. 2 is input. With the entry of the reset key 301, all the ever set functions are cleared and the liquid crystal display (LCD) 202 makes the display of the reset mode as shown in the state 7-1 in FIG. 6-3 (5.1).

The aspect of display on the liquid crystal display 202 and the acceptability of the soft key entry associated with the mode shift between the reset mode and the option mode has been described. Next, the copy function setting procedure by means of soft keys in the transition states 7-2 and 7-3 will be described.

As copy functions which are considered to be effectively set with the use of the soft keys, there are the setting of reproduction ratio, the designation of sorter operating mode and sorter and bottle used, the designation of the document reading position, the selection of paper feed stage and the size of copy medium, the designation of image editing procedure, and the setting of the transfer destination of image (in a copier with facsimile). Here, the setting of the reproduction ratio will be described with reference to the transition state diagrams in FIGS. 6-C and 6-E(a) and 6-E(b), as well as the flowcharts in FIGS. 6-B and 6-D(a) through 6-D(c). In the transition state 7-1 in FIG. 6-C, the soft key label (□→□) indicative of real size copy is displayed for the purpose that the alteration of reproduction ratio is facilitated and the operation efficiency is improved in consideration of the fact that the reset mode is frequently used by changing only the reproduction ratio. In order to change the reproduction ratio, the soft key for the reproduction ratio display soft key label with the underbar is pressed (FIG. 6-B, 5.11), by which the reproduction ratio can be changed (FIG. 6-B, 5.8).

The reproduction ratio is set by two methods, one for designating the reproduction ratio in % as the original rate by means of ten key group 108, and the other for selecting from the fixed reproduction ratio values. When the soft key F4 is pressed in FIG. 6-C, 7-1, the display turns to as shown in FIG. 6-E(a), 19-1 and the reproduction ratio set-up is started (6.1). In the state 19-1, the labels corresponding to keys F1 to F6 means reduction between fixed sizes (F1), expansion between the fixed sizes (F2), real size designation (F3), designation of any given reproduction ratio (F4), separate designation in the longitudinal and lateral directions (F5) and confirmation of the set-up state before changing the reproduction ratio (F6).

When the function key F1 for the label of reduction between the fixed sizes (□→□) is pressed, the display changes to the transition state 19-2 and all or a part of the reduction combinations of fixed sizes is displayed as the soft key label (6.2). Then, the entry of soft key of interest determines the reproduction ratio as shown in state 19-6 and turns ON the function established flag (6.3) to display the exclamation mark, and the display shifts to the state 7-2 in FIG. 6-C. If the desired combination is not displayed in the state 19-2, other remaining combinations are displayed as in the state 19-3 by pressing the soft key labeled ETC. Then, upon pressing the soft key for reduction rate label of interest, the display shifts to the state 19-6. Here, if another ETC is input, the state 19-3 is displayed when other combinations exist or it returns to the state 19-1 for the selection of the kind of the reproduction ratio to be set when no other combinations exist (6.5). That is, by continuously pressing the function key ETC, the escape from the present mode and the selection of other modes is possible.

When the soft key F2 of the enlargement between fixed sizes is pressed in the transition state 19-1 (6.6), the display is processed in the same manner from the state 19-4 to the state 19-2. When the soft key F3 for real size is pressed (6.7) in the state 19-1, the display turns to the Option input acceptable state as shown in the transition state 7-2 except for the reproduction ratio 100%. It is also applied to the case that the Confirm key F6 is pressed in the state 19-1.

When Reproduction Ratio Select is input from the soft key F4 in the state 19-1 (6.8), the display makes a display "R.R.Sel" as shown in the state 19-7 to indicate that the operation unit is waiting for the reproduction ratio input and the underline on key F4 blinks to request the entry from ten key group 108 (6.8). R.R. is the abbreviation of Reproduction Ratio. Here, the reproduction ratio is decided (for example, 123%) with the inputs from ten key group 108 (6.9) and the enter key 109 in FIG. 2 and the state 19-8 in FIG. 6-E(b) is displayed (6.10). If the reproduction ratio is erroneously selected, the error message is displayed to wait the reproduction ratio input (6.11). When it is intended to change the selected value in the state 19-8, pressing the soft key (here, F4) on which the selected value is displayed displays the state 19-7 to indicate that the reselection of the value is possible (6.1). In the transition state 19-8, by pressing the soft key labeled OK, the state is shifted to the transition state 7-2 while keeping the reproduction ratio decided state 19-14 (6.13). It is also possible to decide the selected value with the enter key entry after the entry from ten key group 108 in the state 19-7 to shift to the state 19-14 shown by the dotted lines (6.14).

In the state 19-1, if the soft key F5 for separate selection of the reproduction ratio in vertical and horizontal directions is pressed, it is shifted to the state 19-9 (6.15). In the state 19-9, "X Y Ind. R.R. Sel (ten key)", the present state and the input means are displayed and after a certain period of time passes measured by a timer, the display is in the wait state for the entry of the X direction reproduction ratio in the state 19-10 (6.16). As an alternative means to make the display to be in the input wait state, pressing the clear key 104 in FIG. 2 and the like by an operator may be possible. In the state 19-10, the abbreviation R R X (reproduction ratio in X direction) is displayed and the value for the reproduction ratio in X direction, which is selected before the display is in the state 19-9, is added after R R X, and the underbar under the RRX and the selected value blinks to request the entry of another value.

When the reproduction ratio in X direction is input by the combination of ten key group 108 and the enter key, the display is shifted to the state 19-11 to wait for the entry of the reproduction ratio in Y direction (6.18). If the input is made only by the enter key, the value which has been displayed first in the state 19-10 is selected as it is, by which the necessity to input again the value in X direction, which is not required to change when only the reproduction ratio in Y direction is to be changed, is eliminated and hence the operation efficiency is improved (the same thing is also applied to the case for changing only the X direction value).

The value on the underbar which has been selected before, is cleared by input from ten key group 108 and the newly inputted value by ten key group 108 is displayed (6.19). With the entry from ten key group 108, the underbar which is blinking becomes the soft key label indicative of change and stops blinking.

After the reproduction ratio in Y direction is inputted in the same manner, the display shows the state 19-12 (6.20), in which the selected values in both directions can be changed by inputting soft keys corresponding to underbars under the selected reproduction ratio display portions after R R x and R R y (6.21). The reproduction ratio values displayed over the underbars which blink indicative of change in the states 19-10 and 19-9 may be either the values which are obtained before entering the state 19-9 or the values changed with the entry of the enter key. With respect to the reproduction ratio display in the state 19-7, the same thing is applied.

In the transition state 19-12 in FIG. 6-E(*b*), when the soft key labeled "OK," is inputted, the display is as shown in the state 19-13 and shifts to the state 7-2 in FIG. 6-C.

In FIG. 6-E(*a*), when the confirmation of the selected state before the reproduction ratio values are changed is requested in the state 19-1, the values which have been selected before in the state 19-1 are displayed even if the values are changed with the enter input after in the state 19-1 and the values which are selected this time are cancelled (6.23).

In the transition state 19-10, as a soft key label for the soft key F5, "Explain" is displayed. This key label is displayed in order to solve the inconvenience that an inexperienced operator cannot continue succeeding input operations which occurs because the state 19-9 and the message display of inputting means disappear due to the input data display by the operator. This device has a function to inform the operator of the present input state and inputting method by turning the display to the state 19-9 with the entry of this soft key label (6.17). Conventional fixed function key may be substituted for an input means having this function (not shown).

In addition, a preset key which performs a series of above mentioned operations which are stored in a memory with a onetime key entry may be provided in the operation unit.

Also, when errors in the operation of the entire system or the device occur and the key entry is not acceptable, the error status and a countermeasure to cancel the error may be displayed on the key label display portions in detail in addition to the above mentioned matters.

Further, a key for selecting a desired mode or data may be different from the above mentioned soft key.

As has been mentioned above, since it is possible to display the message to the operator and the data input by the operator on unused portions of the key label display portions for the soft keys, the usability of the key label display portions is effectively improved and the necessity to provide additional display portions for a message is eliminated, so that the operation unit is simplified.

Further, the key labels and operation guidance can be displayed on the same display portions, so that the operator can select the functions without taking notice of other things and hence the operation efficiency is improved.

In addition, with the provision of means to distinguish the message from the soft key labels, the mistaken operation by the operator can be reduced, and operation is facilitated and the time required for operation can be reduced.

Therefore, in accordance with the present invention there has been provided an image processing system having a simple operating device in which the function is reliably selected, the operation efficiency is improved and the display for the confirmation of the selected function is made on the soft key display portion.

The operating device according to another embodiment of the present invention will be described in detail hereinbelow in conjunction with the aspect of display and the like.

FIG. 7-A shows the state of display on the display device 202 in the soft key portion 200 when the power source is On or the Real Size reset key 301 in FIG. 2 is pressed.

An area a includes 11 liquid crystals on the left hand as an area for displaying the designation of edit mode in which any of the characters in FIG. 7-B can be displayed without fail. In FIG. 7-B, DPAD is the abbreviation of Document Position Autodetection. An area b includes 5 liquid crystals in FIG. 7-A as an Auto display area and "Auto" is displayed as shown in FIG. 7-C only when Auto Fixed-Ratio Scaling (A.F.R.S.) in the Edit modes is selected. An area c includes 10 liquid crystals as a reproduction ratio display area in which any of displays in FIG. 7-D can be displayed. In FIG. 7-D, a bd portion is an example of the reproduction ratio values input by the operator. When a key SK6 corresponding to "ETC" in FIG. 7-A is pressed, the display is changed to the state shown in FIG. 8-A.

An area d in FIG. 8-A includes five liquid crystals as an on-off display area for negative (NEG.)/positive (POS.) Reverse, in which any one of the characters in FIG. 8-B is displayed. An area e includes 11 liquid crystals as a display area for send mode designation in which any of displays in FIG. 8-C can be displayed.

As an example of function setting, the procedure for setting the reproduction ratio change function will be described with reference to a flow-chart of reproduction ratio mode setting in FIG. 9-B. Pressing the key SK4 corresponding to "100% !!!" (indicative of real size copy) in FIG. 7-A makes a display shown in FIG. 9-A on the display 202. Here, if any key other than key SK 6 corresponding to "Clr." is pressed, the device will be in the reproduction ratio change mode. Pressing the key SK6 corresponding to "CANC" returns the display to the stage before the reproduction ratio change mode is selected, that is, the state shown in FIG. 7-A. The key SK6 is one of the reset keys. When the key SK 1 indicative of an enlarged copy in FIG. 9-A is pressed, the enlargement variations in the bb portion in FIG. 7-D appear together with question marks. Desired enlargement value is displayed by pressing a key SK6 for "ETC" and if a key for a desired value is pressed, the question mark is changed to an exclamation mark indicating that the value is set. Similarly, pressing a key SK2 indicative of reduced copy makes a display of the reduction variations in the be portion in FIG. 7-D together with question marks and the key is set in the same manner. Pressing the key SK3 corresponding to "95%" or the key SK4 corresponding to "100%" makes a selected reproduction ratio value shown in the ba portion in FIG. 7-D together with the exclamation mark. FIG. 9-C shows the transition state of display on the display 2-2 when the key SK5 corresponding to "% Des." The procedure for setting any reproduction ratio change mode is started from the state 9-*a* when the reproduction ratio in X direction is not the same as that in Y direction or from the state 9-*b* when both are the same. Pressing a key SK6 for "Clr." clears a given reproduction ratio change mode and the state returns to the stage before the mode is set, that is, to the display state in FIG. 9-A (the key SK6 is one of the reset keys).

In the display state 9-c, when the key SK5 corresponding to "NO !!!" is pressed, the display shifts to the state 9-d. To the portions for flickering underbars, a desired reproduction ratio, for example, 123%, is set by means of ten key group 108 and the enter key 109 in FIG. 2 to shift to the display state 9-e. Pressing the key SK5 for "NO ?" makes a display in the state 9-e. While pressing the key SK5 for "OK" makes a display in the state 9-g indicating that the reproduction ratio is set. If the ratio is to be further changed, the display is returned to the state 9-d by pressing a key corresponding to a set portion (for example, 9-h), then the reproduction ratio can be set again.

In the display state 9-c, pressing the key SK4 corresponding to "YES ?" shifts the display to the state 9-i in FIG. 9-D. In the state 9-f, pressing the key corresponding to "YES !!!" shifts the display to the state 9-i in FIG. 9-D.

The aspect of display will be described with reference to FIG. 9-D. In the state 9-i, in order to set the reproduction ratio in X and Y directions, the underbar of the X direction reproduction ratio display portion blinks. When inputting the reproduction ratio by ten key group 108 and the enter key, it is shifted to the display state 9-j and then the underbar of the Y direction reproduction ratio display portions blinks in order to set the reproduction ratio in Y direction. When the reproduction ratio (for example, 78%) is input in the same manner, it is shifted to the display state 9-k. The display state 9-c in FIG. 9-C is shifted to the state 9-k in FIG. 9-D by pressing the key SK4. When the reproduction ratio is to be changed here, pressing the corresponding key such as 9-l or 9-m (here, 2:1) returns the state to the display state 9-n or 9-j. The state 9-k is shifted to the state 9-p by pressing the key SK5 corresponding to "OK" and the setting of reproduction ratio is completed.

In the display states 9-i, 9-j, 9-k and 9-n, pressing the function key (soft key) SK6 corresponding to "Clr.", the state is returned to the stage before the reproduction ratio is set as shown in FIG. 9-A (so that the key SK6 is one of the reset keys).

The send mode provided by inputting the SK2 key in FIG. 8-A will be described (see a flowchart in FIG. 10-A). The display state is shifted to the state 10-a in FIG. 10-B by inputting the key SK2 in FIG. 8-A.

The display state is shifted to the state 10-b after a given time passes as measured by the timer. Here, the send destination is designated (FIG. 10-A, state 10-aa). "#1?", "#2?", "#3?" are number addresses for terminal. The message in the brackets is the message to the operator and hence in the display state 10-b, the function key SK1 is not input even when pressed. When a function key corresponding to a desired send destination terminal is pressed, the question mark changes to the exclamation mark to show that the key is input. In this embodiment, three terminals are shown but more than three terminals may be used. Now, when all of the terminals (self-terminal is not included) are set as the send destinations with the key input operations, the state is shifted to the display state 10-c in FIG. 10-B. However, in the display state 10-b and 10-c, pressing the cancel key SK6 returns the state to the display state shown in FIG. 8-A, while pressing the key SK5 for OK shifts the state to the display state 10-d for the send cassette size select mode (FIG. 10-A, 10-bb).

In the send mode, send cassette size designate means to designate the size of print sheet to be sent to the send destination. When the destination has no sheets of that size, the transmission is stopped and a display indicative of the stopped transmission is made. On the other hand, in the send mode including the self-printer, the size selection is not needed and the size selection is automatically made with respect to the size of the cassettes which are attached to the self-printer. As has been mentioned above, various send states are displayed on the display portions distinguishable from one another.

Next, with reference to FIG. 11-A(a) and 11-A(b), the frame mode will be described. In the frame mode, the selection as to whether the useless portion of the image area is to be whitened or blackened is made (11-b). Here, pressing the key SK6 for "Clr." returns the display to the state 11-aa in FIG. 11-B. Similarly, in FIG. 7-A, when the soft key SK1 corresponding to "Edit ?" is pressed, the display is shifted to the state 11-aa. In the display state 11-bb in FIG. 11-B, pressing the soft key SK1 or SK2 sets the flag to whiten the useless portion of the image area, while pressing the soft key SK3 or SK4 sets the flag to blacken the useless portion thereof. Then, in the step 11-c in FIG. 11-A(a), Frame Point Set is inputted by means of the clear key 114 and the enter key 109. In FIG. 11-B, the display state 11-cc (for a given period of time measured by the timer) is shifted to the state 11-dd and the underbar blinks to wait for the input from ten key group 108. Then, for example, Frame Point is set as shown in the display state 11-ee by ten key group 108. When the value is to be changed, the clear set key 114 in FIG. 2 is pressed for resetting (the clear set key 114 may also be considered as one of the reset keys) or a soft key under the value which is to be reset is pressed. In the display state 11-ee in FIG. 11-B, pressing the key SK5 corresponding to OK shifts the display to the state 11-ff for Shift Point Set (corresponding to the step 11-d in FIG. 11-A(a)). The display state 11-ff is shifted to the display state 11-gg by the Timer, Pressing the soft key SK1 advances the step 11-d in NO direction (only the reproduction ratio is changed) into the step 11-h in which Auto Full-Page Scaling (A.F.P.S.), Auto Fixed Ratio Scaling (A.F.R.S.) or Reproduction Ratio Select (R.R.Sel.) is selected.

In the display state 11-gg in FIG. 11-B, pressing the soft key SK2, SK3 or SK4 shifts the mode to the step 11-e or 11-f in FIG. 11-A(a) or 11-g in FIG. 11-A(b) in which the frame area is shifted.

When the frame area is to be shifted to a certain position, the soft key SK2 corresponding to "S.S.L. ?" is pressed (Set Flag of Designating Shift Destination) to set the Shift Point as in the case of the frame point set and to enter the step 11-h for reproduction ratio setting.

After it is advanced in No direction in the step 11-e and then in YES direction in the step 11-f in FIG. 11-A(a), that is, when the soft key SK4 is pressed in the display state 11-gg in FIG. 11-B (Set Flag of Cor.), it is advanced to the step 11-h in FIG. 11-A(b) for the reproduction ratio setting (which is the same as the reproduction ratio change mode in which the document is placed on the corner of the document support).

Next, the designation of shift destination, shift to corner and shift to center in the frame mode will be briefly described with reference to the drawings showing the relative position between the document support and the document.

FIG. 12-A shows the state that the document is placed on the support, in which the origin (0,0) is on the upper left corner of the support, 903 is the document support shown in FIG. 12-A, and 12-a is the document. The frame point is set by designating the X axis TXMAX, TXMIN and the Y axis TYMAX, TYMIN (mm) of the diagonal positions (12-b, 12-c) in any rectangular area as shown in FIG. 12-B.

In the setting of the shift destination of the frame area, it is designated as to where the point (FIG. 12-B, point 12-b)

between the designated minimum X and Y axes in the frame area is moved (FIG. 12-C, point 12-b').

Next, Shift to Corner will be described. In order to make the coordinates of the minimum point 12-b in the frame area in FIG. 12-B (0,0), the X axis and Y axis values of the point 12-b are respectively subtracted from the X axis and Y axis values at the four points of the frame area to define the resulting points of different coordinates as the shift points 12-b" and 12-c" (FIG. 12-D). Thereafter, if the reproduction ratio is to be changed, enlargement or reduction process is performed. For example, FIG. 12-E shows the reduction and FIG. 12-F shows the enlargement, in each of which the point 12-b" in FIG. 12-D remains unchanged.

Next, Shift to Center will be described. FIG. 12-G shows the procedure to decide the shift point based on the data (the coordinates of points 12-b and 12-c in FIG. 12-B) input by setting the frame point. FIG. 12-H is a representation of centering in which the size is doubled in both X and Y directions. In FIG. 12-G, PSX and PSY define the X and Y direction length of a copy paper. In the step 12-aa, TXMAX-TXMIN and TYMAX-TYMIN give the effective Frame width in X and Y directions, which are respectively multiplied by the reproduction ratio values to obtain the length in X and Y directions of the frame area which is actually copied. Thus, TXM and TYM are as shown in FIG. 12-H (in which the reproduction ratio is MX=MY=2).

In FIG. 12-H, the values are 0 or pluses in X and Y directions. Thus, in the step 12-bb, unless TXM$\geq$0 and TYM$\geq$0, no coordinates are present on the support and hence the warning is displayed. While, when TXM$\geq$0 and TYM$\geq$0, and the point 12-b in FIG. 12-B is shifted in such a manner that TXM is substituted for TYMIN, the result will be as shown in FIG. 12-H.

Next, Blank will be described in Edit Mode. FIG. 13-A is a flowchart thereof. In the display state 11-aa in FIG. 11-B, pressing the function key SK3 or SK4 corresponding to "Blank ?" provides Blank mode (display state 13-a in FIG. 13-B).

Here, when the key SK1 or SK2 is pressed, the blank area is whitened, while, when the key SK3 or SK4 is pressed, the blank area is blackened and the next key input shifts the display to the display state 13-b (the step 13-aa in FIG. 13-A). Then, pressing the key SK4 corresponding to "YES ?" (the step 13-bb in FIG. 13-A) provides the display state 13-c and the display is sequentially shifted in the order of 13-c→13-d→13-e→13-c . . . by pressing the key SK5 corresponding to "ETC" in each state. While, in the state 13-a, if the key SK6 (Clr. key) is pressed, it returns to the state 11-aa in FIG. 11-B and resetting is possible, and in the state 13-b, if the key SK6 is pressed, it returns to the display state 13-a. Similarly, in the state 13-c, 13-d or 13-e, pressing the key SK6 returns the state to the display state 13-b. In the display state 13-e, MIN is minimal size, LTR is letter size, LGL is legal size and LDR is ledger size. Now, for example, if the soft key SK4 corresponding to "B4?" is pressed in the display state 13-d(FIG. 13-A the step 13-cc) and Blank Point is set in the step 13-dd, the B4 sized document is automatically changed to the size of the selected paper cassette and is copied. In the step 13-bb in FIG. 13-A, if the original size is irregular, that is, if the key SK5 corresponding to "NO?" is input in the display state 13-b, the display is shifted to the display state 13-f in FIG. 13-B. Then, pressing the key SK6 returns the state to the display state 13-b in FIG. 13-B for resetting. Then, the coordinates are set by ten key group 108 input and Blank Point is set in the same manner as the frame point in the step 13-dd in FIG. 13-A. The display state 13-g in FIG. 13-B is an example of setting. In this case, the blank area is whitened (White Blank) and the reproduction ratio is automatically set (Auto Fixed-Ratio Scaling (A.F.R.S.)), so that even though the soft key SK4 corresponding to "100%" is pressed, the reproduction ratio change setting is impossible.

Next, DPAD (Document Position Auto Detection) will be described.

FIG. 14-A shows that state that the document is placed on the document support of the reader A in FIGS. 1-A and 1-B. Although the mounting position is determined fundamentally based on the origin, it may be placed in an inclined state as shown in the drawing. If the key SK5 corresponding to "ETC" in the display state 11-aa in FIG. 11-B is pressed, the display state is as shown in FIG. 14-E. Then, if the key SK1 corresponding to "DPAD?" is pressed, DPAD mode is obtained. With DPAD mode, a desired portion of a document can be copied simply by placing the document in a proper position on the document support, even when it is not aligned with the reference position on the support.

In FIG. 14-A, four sets of coordinates $(X_1,Y_1)$, $(X_2,Y_2)$, $(X_3,Y_3)$ and $(X_4,Y_4)$ which are obtained when the main and sub scanning directions from the reference coordinate origin SP on the document support are respectively defined as X and Y are pre-scanned and detected by an optical system during the pre-rotating operation of the printer, by which the size and position of a document can be discriminated and therefore the scanner scanning stroke during multi-copying operation can be determined and a desired cassette can be selected. The document cover 904 (FIG. 1-B) is mirrored in such a manner that the image data except for an area on which the document is placed is surely blackened. The entire surface of the glass is pre-scanned in the main and subscanning directions and then the scanning for printing follows. The sub scanning speed is faster than that for printing.

FIG. 14-B is a logic circuit diagram for detecting the above mentioned coordinates. The image data VIDEO which is divided into two values during pre-scanning is input into a shift register 501, 8 bits as a unit. At the completion of the 8-bit input, a gate circuit 502 checks the 8-bit data as to whether all are white images or not, and if Yes, outputs "1" on a signal line. F/F 504 is set when a first 8-bit White appears after the document scanning is started. The F/F is reset in advance by VSYNC (image leading edge signal) and is left set until the next VSYNC is received. When the F/F 504 is set, a value which is obtained by a main scanning counter 551 at that time is loaded on a latch F/F 505. This loaded value is the X axis value. While a value which is obtained from a sub-scanning counter 552 at that time is loaded on a latch 506. This loaded value is the $Y_1$ axis value. Accordingly, $P_1(X_1,Y_1)$ is obtained.

Every time "1" is output on a signal line 503, a value obtained from main scanning is loaded on a latch 507 and is immediately (before the next 8 bit enters the shift register 501) stored in a latch 508. A value which is obtained by the main scanning when the first 8 bit White appears is loaded on the latch 508 and is compared with the data in a latch 510 (which is preset at "O" upon the receipt of VSYNC) by a comparator 509 in magnitude. If the data from the latch 508 is larger, the data from the latch 508, that is, from the latch 507, is loaded on a latch 510 and at the same time the value of the sub scanning counter 552 is loaded on a latch 511. This operation is completed before the next 8 bit signal is applied to the shift register 501. If the data from the latch 508 and the latch 510 are processed in this manner over the entire image area, the maximum value in the X direction of the document area is left in the latch 510 and the value in the Y direction is left in the latch 511 ($P_2$ ($X_2,Y_2$) coordinates).

F/F 512 is of the type which is set when the first 8 bit White appears on each main scanning line and is reset by a horizontal synchronous signal HSYNC. The F/F is set by the first 8 bit White and holds it until the next HSYNC comes out. The value of the main scanning counter is set in a latch 513 when the F/F 512 is set and is loaded on a latch 514 before the next HSYNC comes out. Latch 515 is preset by the maximum value in the X direction at the generation of VSYNC. The data from the latch 514 is compared with the data from the latch 515 in magnitude by a comparator 516. If the data from the latch 515 is larger than that from the latch 514, a signal 517 becomes active and the data from the latch 514, that is, the latch 513, is loaded on the latch 515. This operation is performed after the first HSYNC is generated and before the next HSYNC is generated. If the above mentioned comparison is performed over the entire image area, the minimum value in the X direction of the document coordinates is left in the latch 515 ($X_3$). When the signal line 517 outputs a signal, the value from the sub scanning register 552 is loaded on the latch 518 ($Y_3$).

On latches 519 and 520, values of the main scan counter 551 and sub scanning counter 552 are loaded every time the 8 bit White appears and this operation is performed over the entire image area. Hence, at the completion of the document pre-scanning, the count value obtained when the last 8 bit White appears is left in the counter ($X_4, Y_4$).

Data lines of the above mentioned 8 latches (506, 511, 520, 518, 505, 510, 515, 519) are connected to a bus line BUS of the CPU in FIG. 6-A and the CPU reads these data at the completion of the pre-scanning. And an area within the coordinate components $X_2$, $X_3$, $Y_1$, $Y_4$ in these data is discriminated as the document area and the framing is performed during the scanning of document for printing is performed. That is, the coordinates of a rectangle shown by the dotted line on which the document positions $P_1$ to $P_4$ are situated can be recognized by the document coordinate components $X_2$, $X_3$, $y_1$, $Y_4$ and hence it is also recognized that at least sheets of the size corresponding thereto are needed.

Next, an embodiment in which the document auto detection is performed and Auto Fixed-Ratio Scaling instruction is input, by which the reproduction ratio of the content of the document is changed so as to meet the size of the sheets in a cassette and the content is printed on the sheet in the cassette will be described.

As shown in FIG. 14-C, mx and my, that is, the ratio of the size Δx, Δy in the X and Y directions of the document to the size Px, Py in the X and Y directions of the sheet are obtained. And a smaller value for the ratio thus obtained is set in a RAM as a common ratio to X and Y and the above mentioned reproduction ratio changing is performed to obtain an automatically scaled copy based on the size in one direction of the sheet.

In FIG. 14-D, the ratio of the size in each of the X and Y directions of the document to the size in each of the X and Y directions of the sheet is obtained and the reproduction ratio in the X direction and the reproduction ratio in the Y direction are separately set, by which the image of the document can be copied on the entire surface of the sheet. The above mentioned two ways of automatic reproduction ratio changing are the same as the above mentioned Auto Fixed-Ratio Scaling which is performed together with frame coordinate setting.

Similarly, the size designation, in the second mode, refers to that of the cassette sheet.

Next, Black Frame Erase Mode will be described. That is, for example, in FIG. 12-A, the frame portion of the document is copied in white. In FIG. 14-E, if the key SK 2 or SK 3 corresponding to "Black Frame Erase ?" is pressed, the display is changed to the state 15-*a* in FIG. 15-A and the black frame erase mode is set. The succeeding procedure will be described with reference to the flowchart in FIG. 15-B. In the display state 15-*a* in FIG. 15-A, if the soft key SK 4 corresponding to "YES ?" which means that the document is of the regular size is pressed (the step 15-*aa* in FIG. 15-B), the display is changed to the display state 15-*b*. Then, the key SK 5 corresponding to ETC is pressed until the desired size is displayed, in which case the display is sequentially changed to 15-*b*, 15-*c*, 15-*d*, 15-*b*. Supposing that the desired size is A3, since the A3 is displayed in the state 15-*b*, the soft key SK 4 corresponding to "A3 ?" is pressed (the step 15-*bb* in FIG. 15-B), the document size data is set in the RAM as A3, and the display is shifted to the display state 15-*e* for the selection of auto fixed-ratio scaling (the step 15-*cc* in FIG. 15-B). Then, if the key SK 4 corresponding to "YES ?" is pressed, the reproduction ratio is automatically determined in the manner of subroutine SUB $AT_2$, SUB $AT_1$ in FIGS. 14-C and 14-D, as described in the previous reproduction ratio change mode and the black frame erase mode setting is completed. On the other hand, if the soft key SK 5 corresponding to "NO ?" is pressed, the display is changed to the state 15-*f* and the real size mode (reproduction ratio 100%) is set.

However, this ratio can be changed under the manipulation of ten key group 108 (the step 15-*ee*), that is, by pressing the soft key SK 4 corresponding to "100% !!!" in the display state 15-*f*.

When the document is of an irregular size, the soft key SK 5 corresponding to "NO ?" is pressed in the display state 15-*a* in FIG. 15-A to change the state to the display state 15-*g*. Accordingly, the document size is determined by inputting the data through ten key group 108 (the step 15-*ee*). The succeeding procedure is the same as that for the regular size document. That is, the black frame erase mode corresponds to the frame mode for the entire document. In addition, in each display state, pressing the soft key SK 6 corresponding to "Clr." returns the state to the previous stage.

Next, Book Mode will be described. In the display state 11-*aa* in FIG. 11-B, if the function key SK 5 corresponding to "ETC" is pressed, the state is shifted to the state in FIG. 14-E. If the function key SK 4 corresponding to "Book ?" is pressed, the book mode is set. FIGS. 16-A(*a*) and 16-A(*b*) show the display state for book mode setting and FIG. 16-B is a flowchart thereof.

In FIG. 14-E, if the key SK 4 is pressed, the display is changed to the state 16-*b* in FIG. 16-A(*a*) and the copy modes are displayed. That is, Half L (only left half portion), Half R (only right half portion), Half L R (left and right portions are sequentially copied on separate sheets), and Full (left and right portions are copied on the same sheet) are displayed. If any one of the keys therefor is pressed, the display is changed to the state 16-*c*. A flag of any copy mode is set in the RAM in accordance with the pressed key, by which the coordinate data is input by ten key group 108 and the print cycle is updated. The display state 16-*c* is related to the size of the book (regular or not) (the step 16-*ff*). If the key for "YES ?" is pressed, it is changed to the state 16-*d* and A6 to A4 are displayed. Then, if the key for ETC is pressed, B7 to B5 are displayed (state 16-*e*) and then if the key for ETC is also pressed, MIN and LTR are displayed. Assuming that A4 size is proper, the (16-*gg*) A4 data is set and the display state (16-*j*) for the propriety of the auto fixed-ratio scaling is obtained (the step 16-*hh*). If a desired size is not displayed or the size is irregular, the display state is changed from the state 16-c to the state 16-g for demanding the input of the length in the X direction (the cursor flickers). If the "175", for example, is set by means of ten key group 108 and the enter key is turned on, the display is changed to the state 16-h and the input of the length in the Y direction is demanded. Then, if the "250" is set, the display state 16-i is obtained (the step 16-jj). If an error is found in the data at this stage, the length in the X direction can be corrected by turning on the key SK 1 and similarly the length in the Y direction can be corrected by turning on the key SK 3. If the length values in the X and Y directions are set in excess of the limit, the message "Mis Book Size Set" is displayed when the enter key is turned on. If not, the key SK 5 for "OK" is pressed in the state 16-j to advance the display to the next reproduction ratio step 16-j. If the key for affirming "A.F.R.S. (Auto Fixed-Ratio Scaling)" is pressed in the state 16-j, "A.F.P.S.? (Auto Full Page Scaling)" is displayed in the state 16-k. If "YES ?" is pressed, the reproduction ratio is determined from the size of the document and the size of the copy paper by the above mentioned subroutine AT 2 and the state 16-1 is displayed. While, if "NO ?" is pressed, the reproduction ratio is determined in the same manner by the subroutine AT 1 at the state 16-m is displayed. On the other hand, if the key for denying the auto fixed-ratio scaling is pressed, the state 16-n is displayed and the real size is set. In the state 16-n, the reproduction ratio can be changed in the above mentioned manner. The steps following the step 16-hh are the same as those for the above mentioned black frame erase mode. In the states 16-l to 16-n, the copy modes are also displayed indicating that the book data setting is completed.

FIG. 16-C shows the relative position of the book and the platen face, in which the book is placed along the effective end portion of the platen with the binding margin in alignment with the BOOK point. L and R are the scanning strokes of the optical unit for printing a left half portion and a right half or full portion of the book, respectively.

In FIG. 16-B, before stepping on the Auto Fixed-Ratio Scaling, the coordinates are shifted in accordance with the copy mode based on the size data (primary shift), that is, in case of the L mode, TYMIN←$Y_1$, TYMAX←($Y_2+Y_1$)×½, in case of the R mode, TYMIN←($Y_2+Y_1$)×½, TYMAX←$Y_2$, and in case of the full mode, the shift data for L and R are stored. Then, the above mentioned Ctr. Shift routine is executed at the end of the Auto Fixed-Ratio Scaling routine, that is, the document is shifted to center in accordance with the shifted coordinates and the reproduction ratio, to determine the final coordinates. In addition, in case of L and R mode, the inversion position of the optical unit is determined from the shifted coordinates and set: that is, ($Y_1+Y_2$)×½+r for the L mode, and $Y_2$+r for the full and R modes. In case of the half L R mode, when the optical unit returns to the original position at the completion of the first cycle scanning for the L portion, the main CPU judges whether the LR flag is set in the RAM and, when it is set, reads out the data for the R portion. Then, the optical unit commences the scanning of the second cycle to print the right half portion of the document on the sheet. The L and R portions are printed on the center of the sheet.

The DPAD mode is almost the same as the BOOK mode: in the DPAD mode, the position and size of the document are automatically recognized and set in the RAM, while in the BOOK mode, the position of the document is fixed and the size thereof is set in the RAM with the manipulation of the soft key. That is, the routines for regular and irregular-sized books as shown in FIG. 16-B are not included and the reproduction ratio values obtained when the auto fixed-ratio scaling is set are not displayed.

Accordingly, in the DPAD mode, the coordinates are shifted when the optical unit reads the coordinates of the document during pre-scanning after the copy key is ON. That is, the primary coordinate shifting, the shifting to center, and the reverse position setting in FIG. 16-B are performed during pre-scanning and before the commencement of regular scanning.

In the DPAD and BOOK modes, the black frame erasing (framing) is automatically performed.

In the above mentioned Blank mode, the blanking and reversing of the data read from the CCD is performed by the circuit shown in FIG. 18. CCD 1-System VIDEO and CCD 2-System VIDEO are obtained by changing the picture quality of two CCD outputs by dazzling and the like and stored in shift memories (1) and (2) for one line in the X direction. Image Data VIDEO is output from the shift memories in accordance with the reproduction ratio change data and shift data.

In FIG. 18, 90 and 91 are exclusive OR gates and OF is a signal for controlling the OR gates. The signal OF blanks the in-f rame portion which is determined by ST and EN counters 80 and 81, respectively, and makes an output image of the out-frame portion, when at "1", or it makes an output image of the in-frame portion and blanks the out-frame portion, when at "0". AND gate 92 is used for controlling the output of the image data. AND gate 93 is used for determining whether said blanked portion is to be outputted in black or white. BB is a signal for controlling the operation of the AND gate 93 and outputs the blanked portion in black at "1" and in white at "0". OR gate 95 is used for outputting the image output from the gates 92 and 93 as a VIDEO. Exclusive OR gate 94 is used for controlling the white/black reversal of the data image. IN is a signal for controlling the operation of the gate 94, and outputs the image data as a natural image of the original at "1", or reverses the data at "0". Each signal is output when the CPU finds out that the Blank, White Blank, Black Blank, or Neg. is input by the manipulation of soft keys.

With Blank signal "1", when the ST counter counts up, Q of a flip flop 82 goes to "1" and the output of the gate goes to "0", while the gate 92 has no output until the EN counter counts up or Q goes to "0", that is, it is blanked. Instead, since the output of the gate 91 is at "1" during that time, with Black/White signal BB "1", the gate 93 is at "1" and hence the image output gate 95 continuously outputs "1", that is, it is black-blanked. On the other hand, if OF=1, BB=0, it is white-blanked. Since the outputs of the gates 90 and 91 go to "1" and "0", respectively, when OF=0, when BB=1, the out-frame portion is blackened. While, when OF=0, BB=0, the out-frame portion is whitened. The ST counter 80 and EN counter 81 are preset by the above mentioned blank point set data.

The mode setting procedure has been described above. Next, preset keys used for registering the modes thus set will be described. Eight kinds of registrations, that is, reproduction ratio, edit mode, positive/negative, send destination and send size, copy size, document picture quality, the number of copies, and density, are possible. In the display state in FIG. 8-A, if the function key SK 5 for "REG." is pressed, the display state is as shown in FIG. 17-A and the copy modes when the key is pressed are registered by the preset keys. In addition, the modes which are registered by means of preset keys may be combined with one another or a combination thereof may be newly registered. However, when there exist modes which are incompatible with one another, the priority thereof should be considered. The priority is decided by comparing the above mentioned flags.

FIGS. 17-B and 17-C are flowcharts of the entire device, in which the type 1 is the display state in FIG. 7-A, the type 2 is the display state in FIG. 8-A, and the type 3 is the display state in FIG. 17-A. The edit mode has already been described, so that the description thereof is omitted here (the step S1). When the key SK 6 for "ETC" is pressed, it affects the type 2 liquid crystal display. The Neg./Pos. inversion mode setting state (the step S2) is followed by the send mode (the step S3).

In addition, copying is possible only in the type 1 and 2 display states, and it is possible to return to the stage at which the mode is not yet set by pressing the key for "Clr." in each stage. The registration mode is at the step S4, which will be described hereinafter with reference to FIG. 17-C.

FIG. 17-C is a flowchart for registration, in which PK designates a preset key. In the drawing, when the key SK 5 corresponding to "REG" is pressed, the display state turns to the registration mode (the type 3) (the step 17-*a*) and six displays 303 corresponding to the preset keys 303 in FIG. 2 blink (the step 11-*b*). Then, if the key SK 6 corresponding to "Clr." is pressed, the process of registration is interrupted and the display turns back to the type 2 as shown in FIG. 8-A. That is, the mode setting is returned to the one-stage previous state by means of a cancel key (one of the reset keys). On the other hand, in the step 17-*b* state, pressing any one of preset keys PK i (i=1–6) (FIG. 2, 302) turns off any one of the preset key displays 302 of PK j (j=1–6 i≠j) in the step 17-*c* and the display 302 of the preset key PKi is turned on. Flag "PSi-STATUS" on the RAM which goes to "1" when registered is set to "1" in the step 17-*d* and MAIN$_{13}$ MODEs on the RAM (constituted by eleven flags shown in FIG. 17-D) are stored in corresponding PSi__MODEs on the RAM (constituted by eleven flags in FIG. 17-E), respectively in the step 17-*e*. In the step 17-*f*, MAIN__SD__TBL on the RAM (send data) is stored in PSi__SD__TBL on the Red and in the step 17-*g*, MAIN__EDIT__TBL on the RAM (edit data) is stored in PSi__EDIT__TBL on the RAM.

And, the flag PRi__STATUS on the RAM indicating that the preset modes are registered in the PKi is set to "1".

For the presetting operation, the flag is backed up by a battery, so that it will never go out even when the power source is turned off and it is not zero cleared except when the first writing into the RAM is performed.

As shown in the step 17-*h*, the flag COPY__MODE on the RAM is set to $2^{i+1}$ and turns to the mode of the PKi which is selected as the registration destination, and the preset key display corresponding thereto is turned on and the remaining preset key displays are turned off.

The liquid crystal display turns to the state shown in FIG. 8-A and the registration process is completed.

Next, the procedure for calling the registered modes by means of preset keys will be described with reference to FIGS. 17-F and 17-G.

When the power source is on or the standard mode return key (FIG. 2, 301) is input, the mode is the standard mode (real size reset) and is stored in main and reference mode areas on the RAM. The priority of the preset modes is compared with reference to the main modes and the preset key modes. Mode memories PSi (i=1–6) in FIG. 17-F are preset mode memories on the RAM for registering the modes by means of the preset keys PKi (i=1–6).

Now, assuming that some modes are registered in only the mode memories PS 1, PS 2 and PS 3 under the condition that the power is on and the standard mode is displayed, that is, for example, assuming that "Frame, R.R. 100%" is regis- tered in PSL, when the key PK1 is pressed, in the step 17-*aa* in FIG. 17-G, the answer is YES, in the step 17-*bb*, NO because the PS 1 is the first input, in the step 17-*cc*, NO for the same reason, in the step 17-*dd*, NO because it is the main mode, in the step 17-*ff*, YES because the main mode is the standard mode and hence real size, and in the step 17-*hh*, the calling of the PS 1 mode "Frame, R.R. 100%" is accepted and this PS 1 mode is stored in the main and reference modes in FIG. 17-F (FIG. 17-G, the step 17-*kk*). Even though it is attempted to input again the PS 1 at this stage, in the step 17-*bb*, the answer is YES, so that the input of the PK 1 is not accepted. Similarly, even though a preset key whose mode is not registered in a mode memory, such as PS 4, is pressed, in the step 17-*aa*, the answer is NO, so that the input thereof is not accepted.

Assuming that the reproduction ratio change mode "R.R. 200%" is stored in the mode memory PS 2, when the key PK 2 is pressed, in the step 17-*aa*, the answer is YES, in the step 17-*bb*, NO, in the step 17-*cc*, NO, in the step 17-*dd*, YES because the edit mode of PS 1 is stored as the main mode, in the step 17-*ee*, NO because the mode of the PS 2 is only for the reproduction ratio, in the step 17-*ff*, YES because, even though the edit mode of the PS 1 is stored as the main mode, real size is registered, and in the step 17-*hh*, the mode "R.R. 200%" of the PS 2 is accepted and the mode of the PS 2 is added to the main and reference modes in FIG. 17-F (the step 17-11).

Further, assuming that the reproduction ratio change mode "R.R.C. 150%" is stored in the mode memory PS 3, when the key PK 3 is pressed, in the step 17-*aa*, the answer is YES, in the step 17-*bb*, NO, in the step 17-*cc*, NO, in the step 17-*dd*, YES because the main mode is "Frame.R.R. 200%" of the PS 1 and it is the edit mode, in the step 17-*ee*, NO because the mode of the PS 3 includes only "R.R.C. 150%", in the step 17-*ff*, NO because the reproduction ratio is 200%, in the step 17-*gg*, NO because the mode of the PS 3 is R.R.C 150% and it is the reproduction ratio change mode, so that the key input of the PK 3 is not accepted and hence in the main mode, "Frame, R.R.C. 200%" which is the combination of the PS 1 and PS 2 modes is stored with two key inputs PK 1 and PK 2. Here, if it is intended to change the reproduction ratio, for example, to 152%, and hence "152" is inputted by means of ten key group 108, the main mode will be changed to "Frame, R.R.C. 152%". Then, in order to register this value in the preset key, the reset key is pressed to register the preset mode, for example, PS 4.

The reference mode area is used as a control for the purpose that in comparison with the main mode area, if a difference is found, a corresponding preset key is caused to flicker, while no difference is found, a corresponding preset key is caused to light. And operations such as copy sending and the like are performed based on the main mode data.

As has been mentioned above, according to the present invention, there has been provided an image processing system including a very convenient and highly usable operating unit.

What is claimed is:

1. An operation apparatus comprising:

input means comprising a display unit for selectively displaying plural kinds of parameters necessary for executing a single information processing for an image formed on a sheet, and input units provided correspondingly to said display unit, wherein the number of said input units is smaller than the number of parameters to be displayed on said display unit, wherein said display unit is capable of changing the displayed contents and displaying plural kinds of parameters for the information processing;

memory means for storing a standard parameter group which includes plural kinds of parameters necessary for controlling operation of said apparatus during execution of a single information processing;

register means for registering plural parameter groups, each group including plural kinds of inputted parameters necessary for executing a single information processing by a single input means corresponding to the register means, wherein the plural kinds of parameters of each parameter group are parameters for controlling operation of said apparatus during the execution of the single information processing and for controlling formation of the image; and reading means for reading one parameter group selected from the plural parameter groups necessary to execute the single information processing registered by said register means.

2. An apparatus according to claim 1, wherein said input means further reads a group registered at said register means by means of said reading means.

3. An apparatus according to claim 1, wherein said display unit comprises an LCD controller.

4. An apparatus according to claim 1, wherein the information processing is an editing of image data.

5. An apparatus according to claim 1, wherein said apparatus further comprises input control means which discriminately indicates input by each of the input units.

6. An apparatus according to claim 1, further comprising additional input means, separate from said display unit, for inputting numerical information relating to an input parameter.

7. An apparatus according to claim 1, wherein the plural kinds of parameters include a parameter indicating whether a black-white reverse operation should be performed.

8. An apparatus according to claim 1, wherein the plural kinds of inputted parameters include a parameter indicating whether a book mode processing should be performed.

9. An apparatus according to claim 1, wherein the plural kinds of inputted parameters include a parameter indicating whether a sending processing should be performed.

10. An apparatus according to claim 1, wherein the plural kinds of inputted parameters include a parameter indicating whether a negative-positive reverse should be performed.

11. An inputted apparatus according to claim 1, wherein the plural kinds of inputted parameters include a parameter indicating whether a size change processing should be performed.

12. An apparatus according to claim 1, wherein a combination of processing operations can be executed between the plural parameter groups registered by said register means.

13. An apparatus according to claim 1, wherein said register means determines whether a combination of processing operation can be executed between the plural parameter groups registered by said register means.

14. An apparatus according to claim 1, wherein said register means may modify the plural parameter groups registered by said register means after the plural parameter groups are read.

15. An apparatus according to claim 1, wherein said register means registers the plural parameter groups in accordance with plural keys.

16. An apparatus according to claim 1, wherein the standard parameter group is written to said memory means during manufacturing.

17. An apparatus according to claim 1, further comprising reset means for providing a reset instruction, wherein said reading means reads the standard parameter group from said memory means in response to a reset instruction provided by said reset means.

18. An apparatus according to claim 1, further comprising reset means for providing a reset instruction, wherein said display unit is controlled to display the standard parameter group stored in said memory means in response to a reset instruction provided by said reset means.

19. A method for use with an apparatus including a display unit and input units provided correspondingly to the display unit, wherein the number of input units is smaller than the number of parameters to be displayed on the display unit, and wherein the display unit is capable of changing the displayed contents and displaying plural kinds of parameters for information processing, said method comprising the steps of:

selectively displaying, on the display unit, plural kinds of parameters necessary for executing a single information processing for an image formed on a sheet;

storing in memory a standard parameter group which includes plural kinds of parameters necessary for controlling operation of the apparatus during execution of a single information processing;

registering plural parameter groups, each group including plural kinds of inputted parameters necessary for executing a single information processing by a single input corresponding to the registered parameters, wherein the plural kinds of parameters of each parameter group are parameters for controlling operation of the apparatus during the execution of the single information processing and for controlling formation of the image; and reading one parameter group selected from the plural parameter groups necessary to execute the single information processing registered in said registering step.

20. A method according to claim 19, wherein said input means further reads a group registered at said register means by means of said reading means.

21. A method according to claim 19, wherein said display unit comprises an LCD controller.

22. A method according to claim 19, wherein the information processing is an editing of image data.

23. A method according to claim 19, wherein the apparatus includes input control means, and said method further comprises discriminately indicating input by each of the input units.

24. A method according to claim 19, further comprising the step of inputting numerical information relating to an input parameter.

25. A method according to claim 19, wherein the plural kinds of parameters include a parameter indicating whether a black-white reverse operation should be performed.

26. A method according to claim 19, wherein the plural kinds of inputted parameters include a parameter indicating whether a book mode processing should be performed.

27. A method according to claim 19, wherein the plural kinds of inputted parameters include a parameter indicating whether a sending processing should be performed.

28. A method according to claim 19, wherein the plural kinds of inputted parameters include a parameter indicating whether a negative-positive reverse should be performed.

29. A method apparatus according to claim 19, wherein the plural kinds of inputted parameters include a parameter indicating whether a size change processing should be performed.

30. A method according to claim 19, wherein a combination of processing operations can be executed between the plural parameter groups registered by said register means.

31. A method according to claim 19, further comprising the step of determining whether a combination of processing operation can be executed between the plural parameter groups.

32. A method according to claim 19, further comprising the step of modifying the plural parameter groups registered by said register means after the plural parameter groups are read.

33. A method according to claim 19, further comprising the step of registering the plural parameter groups in accordance with plural keys.

34. A method according to claim 19, wherein said storing step includes writing the standard parameter group to memory during manufacturing.

35. A method according to claim 19, further comprising the step of providing a reset instruction from reset means, wherein the standard parameter group is read from said memory by reading means in response to a reset instruction provided by the reset means.

36. A method according to claim 19, further comprising the step of providing a reset instruction from reset means, wherein the standard parameter group stored in memory is displayed by the display unit in response to a reset instruction provided by the reset means.

* * * * *

UNITED STATES PATENT AND TRADEMARK OFFICE
CERTIFICATE OF CORRECTION

PATENT NO. : 6,307,540 B1
DATED : October 23, 2001
INVENTOR(S) : Shinobu Arimoto et al.

It is certified that error appears in the above-identified patent and that said Letters Patent is hereby corrected as shown below:

Title page,
Item [*] Notice, insert -- This patent issued on a continued prosecution application filed under 37 CFR 1.53(d), and is subject to the twenty year patent term provisions of 35 U.S.C. 154(a)(2). --.

Sheet No. 18,
FIG. 11-A(a), "BLACKN" should read -- BLACKEN --.

Sheet No. 32,
FIG. 15-B, "(RIAL-SIZE)" (all three occurrences) should read -- (REAL-SIZE) --.

Sheet No. 37,
FIG. 17-B, "REVERRE" should read -- REVERSE --.

Sheet No. 41,
FIG. 17-F, "INACCEPTABLE" should read -- UNACCEPTABLE --; and "MODIFILATION" should read -- MODIFICATION --.

Sheet No. 42,
FIG. 17-G, "SEAL-SIZE" should read -- REAL-SIZE --; and "INACCEPTABLE" should read -- UNACCEPTABLE --.

Column 4,
Line 36, "and" (1$^{st}$ occurrence) should read -- an --.

Column 6,
Line 55, "a" should be deleted.

Column 7,
Line 17, "under bar 2" should read -- underbar 2 --.
Line 53, "under bar" should read -- underbar --.

UNITED STATES PATENT AND TRADEMARK OFFICE
CERTIFICATE OF CORRECTION

PATENT NO. : 6,307,540 B1
DATED : October 23, 2001
INVENTOR(S) : Shinobu Arimoto et al.

It is certified that error appears in the above-identified patent and that said Letters Patent is hereby corrected as shown below:

Column 9,
Line 57, "means" should read -- mean --.

Column 10,
Line 33, "wait" should read -- delay --.

Column 13,
Line 62, "to" should read -- serves to --.

Column 14,
Line 32, "Timer," should read -- Timer. --.

Column 15,
Line 56, "(FIG. 13-A" should read -- (FIG. 13-A, --.

Column 16,
Line 47, "X axis" should read -- $X_1$ axis --.

Column 19,
Line 24, "at" should read -- and --.

Column 20,
Line 23, "in-f rame" should read -- in-frame --.

Column 21,
Line 29, "(j=1-6 i≠ j)" should read -- (j=1-6, i≠j) --.
Line 32, "$MAIN_{13}$" should read -- MAIN__ --.
Line 37, "Red" should read -- RAM --.

Column 23,
Line 44, "inputted" should be deleted.
Line 54, "operation" should read -- operations --.

UNITED STATES PATENT AND TRADEMARK OFFICE
CERTIFICATE OF CORRECTION

PATENT NO.    : 6,307,540 B1
DATED         : October 23, 2001
INVENTOR(S)   : Shinobu Arimoto et al.

It is certified that error appears in the above-identified patent and that said Letters Patent is hereby corrected as shown below:

Column 24,
Line 61, "apparatus" should be deleted.

Column 25,
Line 3, "operation" should read -- operations --.

Signed and Sealed this

Fourteenth Day of May, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,307,540 B1
DATED : October 23, 2001
INVENTOR(S) : Shinobu Arimoto et al.

It is certified that error appears in the above-identified patent and that said Letters Patent is hereby corrected as shown below:

<u>Title page,</u>
Item [*], delete the "[*] Notice" information in its entirety (as in Certificate of Correction Issued May 14, 2001).

Signed and Sealed this

Seventeenth Day of December, 2002

JAMES E. ROGAN
*Director of the United States Patent and Trademark Office*